(12) United States Patent
Piggin et al.

(10) Patent No.: US 10,558,561 B2
(45) Date of Patent: Feb. 11, 2020

(54) SYSTEMS AND METHODS FOR STORAGE METADATA MANAGEMENT

(71) Applicant: SanDisk Technologies, Inc., Plano, TX (US)

(72) Inventors: Nick Piggin, Yarralumla (AU); Santhosh Koundinya, San Jose, CA (US); Nisha Talagala, Livermore, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 617 days.

(21) Appl. No.: 14/253,721

(22) Filed: Apr. 15, 2014

(65) Prior Publication Data
US 2014/0344507 A1 Nov. 20, 2014

Related U.S. Application Data

(60) Provisional application No. 61/872,186, filed on Aug. 30, 2013, provisional application No. 61/812,695, filed on Apr. 16, 2013.

(51) Int. Cl.
*G06F 12/00* (2006.01)
*G06F 12/02* (2006.01)
*G06F 3/06* (2006.01)

(52) U.S. Cl.
CPC ........ *G06F 12/0246* (2013.01); *G06F 3/0643* (2013.01); *G06F 3/0667* (2013.01);
(Continued)

(58) Field of Classification Search
CPC .. G06F 12/0246; G06F 3/0643; G06F 3/0667; G06F 3/0679; G06F 2212/7201; G06F 2212/7207
See application file for complete search history.

(56) References Cited

U.S. PATENT DOCUMENTS

| 4,571,674 A | 2/1986 | Hartung |
| 5,193,184 A | 3/1993 | Belsan et al. |

(Continued)

FOREIGN PATENT DOCUMENTS

| CN | 1771495 | 5/2006 |
| EP | 1418502 | 5/2004 |

(Continued)

OTHER PUBLICATIONS

U.S. Appl. No. 14/253,645, Office Action, dated Oct. 6, 2015.
(Continued)

*Primary Examiner* — Kalpit Parikh
(74) *Attorney, Agent, or Firm* — Kunzler Bean & Adamson, PC

(57) ABSTRACT

A storage layer may be configured to over-provision logical storage resources to objects. The storage layer may provision the resources in response to, inter alia, a request to open and/or create a zero-length file. The storage layer may be further configured to store data of the objects in a contextual format configured to associate the data with respective logical identifiers. The storage layer may determine an actual, storage size of the object based on the associations stored on the stored associations. Storage clients may rely on the storage layer to determine the size of the object and, as such, may defer and/or eliminate updates to persistent metadata.

24 Claims, 9 Drawing Sheets

(52) U.S. Cl.
CPC .... *G06F 3/0679* (2013.01); *G06F 2212/7201* (2013.01); *G06F 2212/7207* (2013.01)

(56) References Cited

U.S. PATENT DOCUMENTS

| | | | |
|---|---|---|---|
| 5,261,068 A | 11/1993 | Gaskins et al. |
| 5,307,497 A | 4/1994 | Feigenbaum et al. |
| 5,325,509 A | 6/1994 | Lautzenheiser |
| 5,392,427 A | 2/1995 | Barrett et al. |
| 5,404,485 A | 4/1995 | Ban |
| 5,438,671 A | 8/1995 | Miles |
| 5,469,555 A | 11/1995 | Ghosh et al. |
| 5,499,354 A | 3/1996 | Aschoff et al. |
| 5,504,882 A | 4/1996 | Chai |
| 5,535,399 A | 7/1996 | Blitz et al. |
| 5,553,261 A | 9/1996 | Hasbun et al. |
| 5,586,291 A | 12/1996 | Lasker |
| 5,594,883 A | 1/1997 | Pricer |
| 5,596,736 A | 1/1997 | Kerns |
| 5,598,370 A | 1/1997 | Nijima et al. |
| 5,651,133 A | 7/1997 | Burkes |
| 5,680,579 A | 10/1997 | Young et al. |
| 5,682,497 A | 10/1997 | Robinson |
| 5,682,499 A | 10/1997 | Bakke et al. |
| 5,701,434 A | 12/1997 | Nakagawa |
| 5,745,792 A | 4/1998 | Jost |
| 5,754,563 A | 5/1998 | White |
| 5,757,567 A | 5/1998 | Hetzler et al. |
| 5,787,486 A | 7/1998 | Chin et al. |
| 5,794,253 A | 8/1998 | Norin et al. |
| 5,802,602 A | 9/1998 | Rahman et al. |
| 5,809,527 A | 9/1998 | Cooper et al. |
| 5,809,543 A | 9/1998 | Byers |
| 5,835,935 A | 11/1998 | Estakhri et al. |
| 5,845,329 A | 12/1998 | Onishi et al. |
| 5,930,815 A | 7/1999 | Estakhri et al. |
| 5,957,158 A | 9/1999 | Volz et al. |
| 5,960,462 A | 9/1999 | Solomon et al. |
| 5,996,054 A | 11/1999 | Ledain et al. |
| 6,000,019 A | 12/1999 | Dykstal et al. |
| 6,014,724 A | 1/2000 | Jennett |
| 6,073,232 A | 6/2000 | Kroeker et al. |
| 6,101,601 A | 8/2000 | Matthews |
| 6,170,039 B1 | 1/2001 | Kishida |
| 6,170,047 B1 | 1/2001 | Dye |
| 6,173,381 B1 | 2/2001 | Dye |
| 6,185,654 B1 | 2/2001 | Van Doren |
| 6,209,088 B1 | 3/2001 | Reneris |
| 6,236,593 B1 | 5/2001 | Hong et al. |
| 6,256,642 B1 | 7/2001 | Krueger et al. |
| 6,279,069 B1 | 8/2001 | Robinson |
| 6,289,413 B1 | 9/2001 | Rogers et al. |
| 6,330,642 B1 | 12/2001 | Brown |
| 6,330,688 B1 | 12/2001 | Brown |
| 6,336,174 B1 | 1/2002 | Li et al. |
| 6,356,986 B1 | 3/2002 | Solomon et al. |
| 6,370,631 B1 | 4/2002 | Dye |
| 6,385,710 B1 | 5/2002 | Goldman et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,507,911 B1 | 1/2003 | Langford |
| 6,523,102 B1 | 2/2003 | Dye et al. |
| 6,564,285 B1 | 5/2003 | Mills et al. |
| 6,587,915 B1 | 7/2003 | Kim |
| 6,601,211 B1 | 7/2003 | Norman |
| 6,625,684 B1 | 9/2003 | Cho et al. |
| 6,625,685 B1 | 9/2003 | Cho et al. |
| 6,629,112 B1 | 9/2003 | Shank |
| 6,658,438 B1 | 12/2003 | Moore et al. |
| 6,671,757 B1 | 12/2003 | Multer et al. |
| 6,715,027 B2 | 3/2004 | Kim et al. |
| 6,751,155 B2 | 6/2004 | Gorobets |
| 6,754,774 B2 | 6/2004 | Gruner et al. |
| 6,775,185 B2 | 8/2004 | Fujisawa et al. |
| 6,779,088 B1 | 8/2004 | Benveniste et al. |
| 6,785,776 B2 | 8/2004 | Arimilli et al. |
| 6,785,785 B2 | 8/2004 | Piccirillo et al. |
| 6,877,076 B1 | 4/2005 | Cho et al. |
| 6,880,049 B2 | 4/2005 | Gruner et al. |
| 6,883,069 B2 | 4/2005 | Yoshida |
| 6,883,079 B1 | 4/2005 | Priborsky |
| 6,938,133 B2 | 8/2005 | Johnson et al. |
| 6,957,158 B1 | 10/2005 | Hancock et al. |
| 6,959,369 B1 | 10/2005 | Ashton et al. |
| 6,981,070 B1 | 12/2005 | Luk et al. |
| 6,996,676 B2 | 2/2006 | Megiddo |
| 7,010,652 B2 | 3/2006 | Piccirillo et al. |
| 7,010,662 B2 | 3/2006 | Aasheim et al. |
| 7,013,376 B2 | 3/2006 | Hooper, III |
| 7,013,379 B1 | 3/2006 | Testardi |
| 7,093,101 B2 | 3/2006 | Aasheim et al. |
| 7,035,974 B2 | 4/2006 | Shang |
| 7,043,599 B1 | 5/2006 | Ware et al. |
| 7,047,366 B1 | 5/2006 | Ezra |
| 7,050,337 B2 | 5/2006 | Iwase et al. |
| 7,058,769 B1 | 6/2006 | Danilak |
| 7,076,599 B2 | 7/2006 | Aasheim et al. |
| 7,082,495 B2 | 7/2006 | DeWhitt et al. |
| 7,085,512 B2 | 7/2006 | Aasheim et al. |
| 7,085,879 B2 | 8/2006 | Aasheim et al. |
| 7,089,391 B2 | 8/2006 | Geiger et al. |
| 7,096,321 B2 | 8/2006 | Modha |
| 7,130,956 B2 | 10/2006 | Rao |
| 7,130,957 B2 | 10/2006 | Rao |
| 7,167,953 B2 | 1/2007 | Megiddo et al. |
| 7,171,536 B2 | 1/2007 | Chang et al. |
| 7,173,852 B2 | 2/2007 | Gorobets |
| 7,181,572 B2 | 2/2007 | Walmsley |
| 7,194,577 B2 | 3/2007 | Johnson et al. |
| 7,194,740 B1 | 3/2007 | Frank et al. |
| 7,203,815 B2 | 4/2007 | Haswell |
| 7,215,580 B2 | 5/2007 | Gorobets |
| 7,219,238 B2 | 5/2007 | Saito et al. |
| 7,243,203 B2 | 7/2007 | Scheuerlein |
| 7,246,179 B2 | 7/2007 | Camara et al. |
| 7,254,686 B2 | 8/2007 | Islam |
| 7,275,135 B2 | 9/2007 | Coulson |
| 7,280,536 B2 | 10/2007 | Testardi |
| 7,293,183 B2 | 11/2007 | Lee et al. |
| 7,305,520 B2 | 12/2007 | Voight et al. |
| 7,328,307 B2 | 2/2008 | Hoogterp |
| 7,340,558 B2 | 3/2008 | Lee et al. |
| 7,340,566 B2 | 3/2008 | Voth et al. |
| 7,356,651 B2 | 4/2008 | Liu |
| 7,360,015 B2 | 4/2008 | Matthews et al. |
| 7,366,808 B2 | 4/2008 | Kano et al. |
| 7,395,384 B2 | 7/2008 | Sinclair |
| 7,398,348 B2 | 7/2008 | Moore et al. |
| 7,418,465 B1 * | 8/2008 | Lewis ................ G06F 3/0601 |
| 7,437,510 B2 | 10/2008 | Rosenbluth et al. |
| 7,447,847 B2 | 11/2008 | Louie et al. |
| 7,450,420 B2 | 11/2008 | Sinclair et al. |
| 7,464,221 B2 | 12/2008 | Nakamura et al. |
| 7,487,235 B2 | 2/2009 | Andrews et al. |
| 7,487,320 B2 | 2/2009 | Bansal et al. |
| 7,516,267 B2 | 4/2009 | Coulson et al. |
| 7,526,614 B2 | 4/2009 | Van Riel |
| 7,529,905 B2 | 5/2009 | Sinclair |
| 7,536,491 B2 | 5/2009 | Kano et al. |
| 7,552,271 B2 | 6/2009 | Sinclair et al. |
| 7,580,287 B2 | 8/2009 | Aritome |
| 7,603,532 B2 | 10/2009 | Rajan et al. |
| 7,610,348 B2 | 10/2009 | Kisley et al. |
| 7,620,773 B2 | 11/2009 | Nicholson et al. |
| 7,640,390 B2 | 12/2009 | Iwamura |
| 7,644,239 B2 | 1/2010 | Ergan et al. |
| 7,664,239 B2 | 1/2010 | Groff et al. |
| 7,657,717 B1 | 2/2010 | Karr et al. |
| 7,660,911 B2 | 2/2010 | McDaniel |
| 7,660,941 B2 | 2/2010 | Lee et al. |
| 7,669,019 B2 | 2/2010 | Fujibayashi et al. |
| 7,676,628 B1 | 3/2010 | Compton et al. |
| 7,702,873 B2 | 4/2010 | Griess et al. |

(56) References Cited

U.S. PATENT DOCUMENTS

| | | |
|---|---|---|
| 7,721,059 B2 | 5/2010 | Mylly et al. |
| 7,725,628 B1 | 5/2010 | Phan et al. |
| RE205,335 | 8/2010 | Phan et al. |
| 7,831,783 B2 | 11/2010 | Pandit et al. |
| 7,853,772 B2 | 12/2010 | Chang et al. |
| 7,873,782 B2 | 1/2011 | Terry |
| 7,873,803 B2 | 1/2011 | Cheng |
| 7,882,305 B2 | 2/2011 | Moritoki |
| 7,904,647 B2 | 3/2011 | El-Batal et al. |
| 7,913,051 B1 | 3/2011 | Todd et al. |
| 7,917,803 B2 | 3/2011 | Stefanus et al. |
| 7,941,591 B2 | 5/2011 | Aviles |
| 7,984,230 B2 | 7/2011 | Nasu et al. |
| 8,046,526 B2 | 10/2011 | Yeh |
| 8,055,820 B2 | 11/2011 | Sebire |
| 8,127,103 B2 | 2/2012 | Kano et al. |
| 8,135,900 B2 | 3/2012 | Kunimatsu et al. |
| 8,135,907 B2 | 3/2012 | Moore |
| 8,151,082 B2 | 4/2012 | Flynn et al. |
| 8,171,204 B2 | 5/2012 | Chow et al. |
| 8,214,583 B2 | 7/2012 | Sinclair |
| 8,392,428 B1 | 3/2013 | Bonwick et al. |
| 8,589,362 B1 | 11/2013 | Braam et al. |
| 8,627,005 B1 | 1/2014 | Bradford et al. |
| 2002/0069318 A1 | 6/2002 | Chow et al. |
| 2002/0103819 A1 | 8/2002 | Duvillier |
| 2002/0161855 A1 | 10/2002 | Manczak et al. |
| 2002/0181134 A1 | 12/2002 | Bunker et al. |
| 2003/0061296 A1 | 3/2003 | Craddock et al. |
| 2003/0140051 A1 | 7/2003 | Fujiwara et al. |
| 2003/0145230 A1 | 7/2003 | Chiu et al. |
| 2003/0149753 A1 | 8/2003 | Lamb |
| 2003/0198084 A1 | 10/2003 | Fujisawa et al. |
| 2004/0003002 A1 | 1/2004 | Adelmann |
| 2004/0093463 A1 | 5/2004 | Shang |
| 2004/0117586 A1 | 6/2004 | Estakhri et al. |
| 2004/0148360 A1 | 7/2004 | Mehra et al. |
| 2004/0186946 A1 | 9/2004 | Lee |
| 2004/0268359 A1 | 12/2004 | Hanes |
| 2005/0002263 A1 | 1/2005 | Iwase et al. |
| 2005/0015539 A1 | 1/2005 | Horii et al. |
| 2005/0027951 A1 | 2/2005 | Piccirillo et al. |
| 2005/0120177 A1 | 6/2005 | Black |
| 2005/0141313 A1 | 6/2005 | Gorobets |
| 2005/0144360 A1 | 6/2005 | Bennett |
| 2005/0177687 A1 | 8/2005 | Rao |
| 2005/0193166 A1 | 9/2005 | Johnson et al. |
| 2005/0216653 A1 | 9/2005 | Aasheim et al. |
| 2005/0240713 A1 | 10/2005 | Wu et al. |
| 2005/0246510 A1 | 11/2005 | Retnamma et al. |
| 2005/0257017 A1 | 11/2005 | Yagi |
| 2005/0268359 A1 | 12/2005 | Mach et al. |
| 2005/0273476 A1 | 12/2005 | Wertheimer et al. |
| 2006/0004955 A1 | 1/2006 | Ware et al. |
| 2006/0020744 A1 | 1/2006 | Sinclair et al. |
| 2006/0026339 A1 | 2/2006 | Rostampour |
| 2006/0059326 A1 | 3/2006 | Aasheim et al. |
| 2006/0064556 A1 | 3/2006 | Aasheim et al. |
| 2006/0075057 A1 | 4/2006 | Gildea et al. |
| 2006/0085626 A1 | 4/2006 | Roberson et al. |
| 2006/0129778 A1 | 6/2006 | Clark et al. |
| 2006/0136657 A1 | 6/2006 | Rudelic et al. |
| 2006/0143396 A1 | 6/2006 | Cabot |
| 2006/0149893 A1 | 7/2006 | Barfuss et al. |
| 2006/0179263 A1 | 8/2006 | Song et al. |
| 2006/0184722 A1 | 8/2006 | Sinclair |
| 2006/0190552 A1 | 8/2006 | Henze et al. |
| 2006/0224849 A1 | 10/2006 | Islam et al. |
| 2006/0236061 A1 | 10/2006 | Koclanes |
| 2006/0248387 A1 | 11/2006 | Nicholson et al. |
| 2006/0265636 A1 | 11/2006 | Hummler |
| 2007/0008852 A1* | 1/2007 | Kobayashi ............ G11B 20/10 369/53.2 |
| 2007/0016699 A1 | 1/2007 | Minamii |
| 2007/0022148 A1* | 1/2007 | Akers ............... G06F 17/30138 |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0043900 A1 | 2/2007 | Yun |
| 2007/0050571 A1 | 3/2007 | Nakamura |
| 2007/0061508 A1 | 3/2007 | Zweighaft |
| 2007/0069318 A1 | 3/2007 | Chow et al. |
| 2007/0088666 A1 | 4/2007 | Saito |
| 2007/0118676 A1 | 5/2007 | Kano et al. |
| 2007/0118713 A1 | 5/2007 | Guterman |
| 2007/0124540 A1 | 5/2007 | van Riel |
| 2007/0136555 A1 | 6/2007 | Sinclair |
| 2007/0143532 A1 | 6/2007 | Gorobets et al. |
| 2007/0143560 A1 | 6/2007 | Gorobets |
| 2007/0143566 A1 | 6/2007 | Gorobets |
| 2007/0143567 A1 | 6/2007 | Gorobets et al. |
| 2007/0147356 A1 | 6/2007 | Gorobets |
| 2007/0150689 A1 | 6/2007 | Pandit et al. |
| 2007/0156998 A1 | 7/2007 | Gorobets |
| 2007/0168698 A1 | 7/2007 | Coulson et al. |
| 2007/0198770 A1 | 8/2007 | Horii et al. |
| 2007/0204128 A1 | 8/2007 | Lee et al. |
| 2007/0208790 A1 | 9/2007 | Reuter et al. |
| 2007/0233937 A1 | 10/2007 | Coulson et al. |
| 2007/0255891 A1 | 11/2007 | Chow et al. |
| 2007/0260608 A1 | 11/2007 | Hertzberg et al. |
| 2007/0261030 A1 | 11/2007 | Wadhwa |
| 2007/0263514 A1 | 11/2007 | Iwata et al. |
| 2007/0266037 A1 | 11/2007 | Terry et al. |
| 2007/0274150 A1 | 11/2007 | Gorobets |
| 2007/0300008 A1 | 12/2007 | Rogers et al. |
| 2008/0010395 A1 | 1/2008 | Mylly et al. |
| 2008/0052377 A1 | 2/2008 | Light |
| 2008/0052477 A1 | 2/2008 | Lee |
| 2008/0091876 A1 | 4/2008 | Fujibayashi et al. |
| 2008/0109543 A1 | 5/2008 | Abanami et al. |
| 2008/0120469 A1 | 5/2008 | Kornegay |
| 2008/0126507 A1 | 5/2008 | Wilkinson |
| 2008/0126700 A1 | 5/2008 | El-Batal et al. |
| 2008/0209090 A1 | 5/2008 | Esmaili et al. |
| 2008/0140737 A1 | 6/2008 | Garst et al. |
| 2008/0155169 A1 | 6/2008 | Hiltgen et al. |
| 2008/0109090 A1 | 8/2008 | Kano et al. |
| 2008/0222219 A1 | 9/2008 | Varajarajan |
| 2008/0229045 A1 | 9/2008 | Qi |
| 2008/0235443 A1 | 9/2008 | Chow et al. |
| 2008/0243966 A1 | 10/2008 | Croisettier et al. |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2008/0276040 A1 | 11/2008 | Moritoki |
| 2008/0294847 A1 | 11/2008 | Maruyama |
| 2009/0070526 A1 | 3/2009 | Tetrick |
| 2009/0083478 A1 | 3/2009 | Kunimatsu et al. |
| 2009/0083485 A1 | 3/2009 | Cheng |
| 2009/0089483 A1 | 4/2009 | Tanaka et al. |
| 2009/0089485 A1 | 4/2009 | Yeh |
| 2009/0125650 A1 | 5/2009 | Sebire |
| 2009/0125700 A1 | 5/2009 | Kisel |
| 2009/0150599 A1 | 6/2009 | Bennett |
| 2009/0150605 A1 | 6/2009 | Flynn et al. |
| 2009/0150641 A1* | 6/2009 | Flynn .................... G06F 3/061 711/202 |
| 2009/0172257 A1 | 7/2009 | Prins et al. |
| 2009/0228637 A1 | 9/2009 | Moon |
| 2009/0248763 A1 | 10/2009 | Rajan |
| 2009/0249001 A1 | 10/2009 | Narayanan et al. |
| 2009/0276588 A1 | 11/2009 | Murase |
| 2009/0276654 A1 | 11/2009 | Butterworth |
| 2009/0287887 A1 | 11/2009 | Matsuki |
| 2009/0292861 A1 | 11/2009 | Kanevsky et al. |
| 2009/0294847 A1 | 11/2009 | Maruyama et al. |
| 2009/0300277 A1 | 12/2009 | Jeddeloh |
| 2009/0307424 A1 | 12/2009 | Galloway et al. |
| 2009/0313453 A1 | 12/2009 | Stefanus et al. |
| 2009/0313503 A1 | 12/2009 | Atluri et al. |
| 2009/0327602 A1 | 12/2009 | Moore et al. |
| 2009/0327804 A1 | 12/2009 | Moshayedi |

(56) References Cited

U.S. PATENT DOCUMENTS

| | | |
|---|---|---|
| 2010/0005228 A1 | 1/2010 | Fukutomi |
| 2010/0017556 A1 | 1/2010 | Chin |
| 2010/0023674 A1 | 1/2010 | Aviles |
| 2010/0023676 A1 | 1/2010 | Moon |
| 2010/0023682 A1 | 1/2010 | Lee |
| 2010/0030946 A1 | 2/2010 | Kano et al. |
| 2010/0076936 A1 | 3/2010 | Rajan |
| 2010/0095059 A1 | 4/2010 | Kisley et al. |
| 2010/0153617 A1 | 6/2010 | Miroshnichenko et al. |
| 2010/0169542 A1 | 7/2010 | Sinclair |
| 2010/0191713 A1 | 7/2010 | Lomet |
| 2010/0205231 A1 | 8/2010 | Cousins |
| 2010/0205335 A1 | 8/2010 | Phan et al. |
| 2010/0211737 A1 | 8/2010 | Flynn et al. |
| 2010/0235597 A1 | 9/2010 | Arakawa |
| 2010/0262738 A1 | 10/2010 | Swing et al. |
| 2010/0262740 A1 | 10/2010 | Borchers et al. |
| 2010/0262757 A1 | 10/2010 | Sprinkle et al. |
| 2010/0262758 A1 | 10/2010 | Swing et al. |
| 2010/0262759 A1 | 10/2010 | Borchers et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262767 A1 | 10/2010 | Borchers et al. |
| 2010/0262773 A1 | 10/2010 | Borchers et al. |
| 2010/0262894 A1 | 10/2010 | Swing et al. |
| 2010/0262979 A1 | 10/2010 | Borchers et al. |
| 2010/0263894 A1 | 10/2010 | Swing et al. |
| 2011/0022819 A1 | 1/2011 | Post et al. |
| 2011/0119455 A1 | 5/2011 | Tsai |
| 2011/0153977 A1* | 6/2011 | Root ............... G06F 12/0223 711/171 |
| 2011/0296133 A1* | 12/2011 | Flynn ............... G06F 11/1048 711/171 |
| 2012/0011340 A1 | 1/2012 | Flynn et al. |
| 2012/0030408 A1* | 2/2012 | Flynn ............... G06F 12/0246 711/102 |
| 2012/0137303 A1 | 5/2012 | Okada et al. |
| 2013/0144844 A1* | 6/2013 | Ito ............... G06F 17/30144 707/688 |
| 2013/0227236 A1* | 8/2013 | Flynn ............... G11C 16/26 711/165 |
| 2013/0311990 A1 | 11/2013 | Chuanbin et al. |
| 2013/0332660 A1 | 12/2013 | Talagala et al. |
| 2014/0089264 A1 | 3/2014 | Talagala et al. |
| 2014/0089265 A1 | 3/2014 | Talagala et al. |
| 2014/0215127 A1 | 7/2014 | Perrin et al. |
| 2014/0310499 A1 | 10/2014 | Sundararaman et al. |

FOREIGN PATENT DOCUMENTS

| | | |
|---|---|---|
| EP | 1814039 | 3/2009 |
| GB | 0123416 | 9/2001 |
| JP | 4242848 | 8/1992 |
| JP | 8153014 | 6/1996 |
| JP | 200259525 | 9/2000 |
| JP | 2009122850 | 6/2009 |
| WO | WO1994019746 | 9/1994 |
| WO | WO1995018407 | 7/1995 |
| WO | WO199612225 | 4/1996 |
| WO | WO200201365 | 1/2002 |
| WO | WO2004099989 | 11/2004 |
| WO | WO2005103878 | 11/2005 |
| WO | WO2006062511 | 6/2006 |
| WO | WO2006065626 | 6/2006 |
| WO | WO2008130799 | 3/2008 |
| WO | WO2008070173 | 6/2008 |
| WO | WO2008070799 | 6/2008 |
| WO | WO2008073421 | 6/2008 |
| WO | WO2011106394 | 9/2011 |

OTHER PUBLICATIONS

Application No. PCT/US2015/012301, International Search Report and Written Opinion, dated Apr. 29, 2015.
Actel, "Actel Fusion FPGAs Supporting Intelligent Peripheral Management Interface (IPMI) Applications," http://www.actel.com/documents/Fusion_IPMI_AN.pdf, Oct. 1, 2006, visited Mar. 11, 2010.
Agigatech, "Bulletproof Memory for RAID Servers, Part 1," http://agigatech.com/blog/bulletproof-memory-for-raid-servers-part-1/, last visited Feb. 16, 2010.
Anonymous, "Method for Fault Tolerance in Nonvolatile Storage", http://ip.com, IP.com No. IPCOM000042269D, 2005.
Ari, "Performance Boosting and Workload Isolation in Storage Area Networks with SanCache," Hewlett Packard Laboratories, Proceedings of the 23rd IEEE / 14th NASA Goddard Conference on Mass Storage Systems and Technologies (MSST 2006), May 2006, pp. 263-27.
Arpaci-Dusseau, "Nameless Writes," HotStorage '10, Boston, MA, Jun. 2010.
Asine, "ASPMC-660 Rugged IDE Flash Drive PMC Module", http://www.asinegroup.com/products/aspmc660.html, copyright 2002, visited Nov. 8, 2009.
Barrall et al., U.S. Appl. No. 60/625,495, "Dynamically Expandable and Contractible Fault-Tolerant Storage System Permitting Variously Sized Storage Devices and Method," filed Nov. 5, 2004.
Barrall et al., U.S. Appl. No. 60/718,768, "Dynamically Adaptable Fault-Tolerant Storage System," filed Sep. 20, 2005.
BiTMICRO, "BiTMICRO Introduces E-Disk PMC Flash Disk Module at Military & Aerospace Electronics East 2004," http://www.bitmicro.com/press.sub, published May 18, 2004, visited Mar. 8, 2011.
Bonnet et al., "Flash Device Support for Database Management," published at the 5th Biennial Conference on Innovative Data Systems Research (CIDR '11), held in Asilomar, California, on Jan. 9-12, 2011.
Brandon, Jr., "Sparse Matrices in CS Education," Journal of Computing Sciences in Colleges, vol. 24 Issue 5, May 2009, pp. 93-98.
Clustered Storage Solutions: "Products," http://www.clusteredstorage.com/clustered_storage_solutions.HTML, last visited Feb. 16, 2010.
Coburn, "NV-Heaps: Making Persistent Objects Fast and Safe with Next-Generation, Non-Volatile Memories", ACM 978-1-4503-0266-1/11/0, published Mar. 5, 2011.
Dan, "Implementing MLC NAND Flash for Cost-Effective, High-Capacity Memory," M-Systems, White Paper, 91-SR-014-02-8L, Rev 1.1, Sep. 2003.
EEEL-6892, Lecture 18, "Virtual Computers," Mar. 2010.
Elnec, "NAND Flash Memories and Programming NAND Flash Memories Using ELNEC Device Programmers, Application Note," published Mar. 1, 2007.
European Patent Office, Office Action, EP Application No. 07865345.8, dated Nov. 17, 2010.
Gal, "A Transactional Flash File System for Microcontrollers," 2005 USENIX Annual Technical Conference, published Apr. 10, 2009.
Garfinkel, "One Big File Is Not Enough: A Critical Evaluation of the Dominant Free-Space Sanitization Technique," 6th Workshop on Privacy Enhancing Technologies. Cambridge, United Kingdom, published Jun. 1, 2006.
Gutmann, "Secure Deletion of Data from Magnetic and Solid-State Memory", Usenix, 14 pages, San Jose, CA, published Jul. 1, 1996.
Hensbergen, IBM Research Report, "Dynamic Policy Disk Caching for Storage Networking," IBM Research Division, Computer Science, RC24123 (W0611-189), Nov. 28, 2006.
Huffman, "Non-Volatile Memory Host Controller Interface," Apr. 14, 2008, 65 pgs.
Hynix Semiconductor, Intel Corporation, Micron Technology, Inc. Phison Electronics Corp., Sony Corporation, Spansion, STMicroelectronics, "Open NAND Flash Interface Specification," Revision 2.0, Feb. 27, 2008.
Hystor: "Making SSDs the Survival of the Fittest in High-Performance Storage Systems," ics10-Paper 102, Feb. 2010.
IBM, "Method to Improve Reliability of SSD Arrays," Nov. 2009.

(56) References Cited

OTHER PUBLICATIONS

Information Technology, "SCSI Object-Based Storage Device Commands," 2 (OSD-2), Project T10/1729-D, Revision 4, published Jul. 30, 2004, printed Jul. 24, 2008.
Intel, "Non-Volatile Memory Host Controller Interface (NVMHCI) 1.0," Apr. 14, 2008.
Johnson, "An Introduction to Block Device Drivers," Jan. 1, 1995.
Kawaguchi, "A Flash-Memory Based File System," TCON'95 Proceedings of the USENIX 1995 Technical Conference Proceedings, p. 13.
Mesnier, "Object-Based Storage," IEEE Communications Magazine, Aug. 2003, pp. 84-90.
Micron Technology, Inc., "NAND Flash 101: An Introduction to NAND Flash and How to Design It in to Your Next Product (TN-29-19)," http://www.micron.com/~/media/Documents/Products/Technical%20Note/NAND%20Flash/145tn2919_nand_101.pdf, 2006, visited May 10, 2010.
Micron, "TN-29-08: Technical Note, Hamming Codes for NAND Flash Memory Devices," Mar. 10, 2010.
Micron, "TN-29-17: NAND Flash Design and Use Considerations," Mar. 10, 2010.
Micron, "TN-29-42: Wear-Leveling Techniques in NAND Flash Devices," Mar. 10, 2010.
Microsoft, "How NTFS Works," Apr. 9, 2010.
Morgenstern, David, "Is There a Flash Memory RAID in your Future?", http://www.eweek.com—eWeek, Ziff Davis Enterprise Holdings Inc., Nov. 8, 2006, visited Mar. 18, 2010.
Novell, "File System Primer", http://wiki.novell.com/index.php/File_System_Primer, 2006, visited Oct. 18, 2006.
Plank, "A Tutorial on Reed-Solomon Coding for Fault Tolerance in RAID-like System," Department of Computer Science, University of Tennessee, pp. 995-1012, Sep. 1997.
Porter, "Operating System Transactions," ACM 978-1-60558-752-3/09/10, published Oct. 1, 2009.
Probert, "Windows Kernel Internals Cache Manager," Microsoft Corporation, http://www.i.u-tokyo.ac.jp/edu/training/ss/lecture/new-documents/Lectures/15-CacheManager/CacheManager.pdf, printed May 15, 2010.
Ranaweera, 05-270RO, SAT: Write Same (10) command (41h), T10/05, Jul. 7, 2005, www.t10.org/ftp/t10/document.05/05-270r0.pdf, last visited Apr. 11, 2013.
Rosenblum, "The Design and Implementation of a Log-Structured File System," ACM Transactions on Computer Systems, vol. 10 Issue 1, Feb. 1992.
Samsung Electronics, "Introduction to Samsung's Linux Flash File System—RFS Application Note", Version 1.0, Nov. 2006.
Sears, "Stasis: Flexible Transactional Storage," OSDI '06: 7th USENIX Symposium on Operating Systems Design and Implementation, published Nov. 6, 2006.
Seltzer, "File System Performance and Transaction Support", University of California at Berkeley, published Jan. 1, 1992.
Seltzer, "Transaction Support in a Log-Structured File System", Harvard University Division of Applied Sciences, published Jan. 1, 1993 (Chapter 5, pp. 52-69).
Seltzer, "Transaction Support in Read Optimized and Write Optimized File Systems," Proceedings of the 16th VLDB Conference, Brisbane, Australia, published Jan. 1, 1990.
Shimpi, Anand, The SSD Anthology: Understanding SSDs and New Drives from OCZ, Mar. 18, 2009, 69 pgs.
Shu, "Data Set Management Commands Proposals for ATA8-ACS2," Dec. 12, 2007, http://www.t13.org.Documents/UploadedDocuments/docs2008/e07154r6-Data_Set_Management_Proposal_for_ATA-ACS2.pdf, printed Apr. 5, 2010.
Singer, "Implementing MLC NAND Flash for Cost-Effective, High Capacity Memory," M-Systems, White Paper, 91-SR014-02-8L, Rev. 1.1, Sep. 2003.
Spansion, "Data Management Software (DMS) for AMD Simultaneous Read/Write Flash Memory Devices", published Jul. 7, 2003.
Spillane "Enabling Transactional File Access via Lightweight Kernel EXtensions", Stony Brook University, IBM T. J. Watson Research Center, published Feb. 25, 2009.
State Intellectual Property Office, Office Action, CN Application No. 200780050983.8, dated May 18, 2011.
State Intellectual Property Office, Office Action, CN Application No. 200780050970.0, dated Jan. 5, 2012.
State Intellectual Property Office, Office Action, CN Application No. 200780051020.X, dated Nov. 11, 2010.
State Intellectual Property Office, Office Action, CN Application No. 200780051020.X, dated Jul. 6, 2011.
State Intellectual Property Office, Office Action, CN Application No. 200780051020.X, dated Nov. 7, 2011.
State Intellectual Property Office, Office Action, CN Application No. 200780050970.0, dated Oct. 28, 2010.
Tal, "NAND vs. NOR Flash Technology," M-Systems, www2.electronicproducts.com/PrintArticle.aspx?ArticleURL=FEBMSY1.feb2002.html, visited Nov. 22, 2010.
Terry et al., U.S. Appl. No. 60/797,127, "Filesystem-aware Block Storage System, Apparatus, and Method," filed May 3, 2006.
United States Patent Office, Final Office Action, U.S. Appl. No. 11/952,109, dated Nov. 29, 2011.
United States Patent Office, Office Action, U.S. Appl. No. 11/952,113, dated Mar. 6, 2012.
United States Patent Office, Office Action, U.S. Appl. No. 11/952,113, dated Dec. 15, 2010.
United States Patent Office, Office Action, U.S. Appl. No. 11/952,109, dated May 1, 2012.
United States Patent Office, U.S. Appl. No. 60/912,728, published as U.S. Application Publication No. 20080263305 dated Oct. 23, 2008.
USPTO, Notice of Allowance for U.S. Appl. No. 12/986,117, dated Apr. 4, 2013.
USPTO, Notice of Allowance for U.S. Appl. No. 12/986,117 dated Jun. 5, 2013.
USPTO, Office Action for U.S. Appl. No. 12/879,004 dated Feb. 25, 2013.
USPTO, Office Action for U.S. Appl. No. 13/607,486 dated Jan. 10, 2013.
USPTO, Office Action for U.S. Appl. No. 12/711,113, dated Jun. 6, 2012.
USPTO, Office Action for U.S. Appl. No. 12/711,113, dated Nov. 23, 2012.
USPTO, Office Action for U.S. Appl. No. 13,607,486 dated May 2, 2013.
USPTO, Office Action for U.S. Appl. No. 13/118,237 dated Apr. 22, 2013.
USPTO, Office Action for U.S. Appl. No. 13/424,333 dated Mar. 17, 2014.
USPTO, Office Action for U.S. Appl. No. 14/030,717 dated Apr. 11, 2014.
USPTO, Office Action, U.S. Appl. No. 11/952,109, dated Nov. 29, 2011.
Van Hensbergen, "Dynamic Policy Disk Caching for Storage Networking," IBM Research Division, RC24123 (W0611-189), Nov. 2006.
Volos, "Mnemosyne: Lightweight Persistent Memory", ACM 978-1-4503-0266-1/11/03, published Mar. 5, 2011.
Wacha, "Improving RAID-Based Storage Systems with Flash Memory," First Annual ISSDM/SRL Research Symposium, Oct. 20-21, 2009.
Walp, "System Integrated Flash Storage," Microsoft Corporation, 2008, http://download.microsoft.com/download/5/E/6/5E66B27B-988B-4F50-AF3A-C2FF1E62180F/COR-T559_WHO8.pptx, Printed Apr. 6, 2010, 8 pgs.
Wikipedia, "Object Storage Device," http://en.wikipedia.org/wiki/Object-storage-device, last visited Apr. 29, 2010.
WIPO, International Preliminary Report of Patentability for PCT/US2007/086691, dated Feb. 16, 2009.
WIPO, International Preliminary Report on Patentability for PCT/US2007/025048, dated Jun. 10, 2009.
WIPO, International Preliminary Report on Patentability for PCT/US2007/059048, dated Oct. 20, 2009.

(56) References Cited

OTHER PUBLICATIONS

WIPO, International Preliminary Report on Patentability for PCT/US2007/086687, dated Mar. 18, 2009.
WIPO, International Preliminary Report on Patentability for PCT/US2007/086688, dated Mar. 16, 2009.
WIPO, International Preliminary Report on Patentability for PCT/US2007/086701, dated Mar. 16, 2009.
WIPO, International Preliminary Report on Patentability for PCT/US2010/048325, dated Mar. 13, 2012.
WIPO, International Search Report and Written Opinion for PCT/US11/65927, dated Aug. 28, 2012.
WIPO, International Search Report and Written Opinion for PCT/US2010/048325, dated Jun. 1, 2011.
WIPO, International Search Report and Written Opinion for PCT/US2011/025885, dated Sep. 28, 2011.
WIPO, International Search Report and Written Opinion for PCT/US2007/025048, dated May 27, 2008.
WIPO, International Search Report and Written Opinion for PCT/US2007/086687, dated Sep. 5, 2008.
WIPO, International Search Report and Written Opinion for PCT/US2007/086691, dated May 8, 2008.
WIPO, International Search Report and Written Opinion for PCT/US2007/086701, dated Jun. 5, 2008.
Wright, "Extending ACID Semantics to the File System", ACM Transactions on Storage, vol. 3, No. 2, published May 1, 2011, pp. 1-40.
Wu, "eNVy: A Non-Volatile, Main Memory Storage System," ACM 0-89791-660-3/94/0010, ASPLOS-VI Proceedings of the sixth international conference on Architectural support for programming languages and operating systems, pp. 86-97, 1994.
Yerrick, "Block Device," http://www.pineight.com/ds/block, last visited Mar. 1, 2010.
Zhang et al., "De-indirection for Flash-based SSDs with Nameless Writes," Usenix InFast 2012 (Feb. 14, 2012).
U.S. Appl. No. 14/067,323, Office Action, dated Jan. 3, 2014.
U.S. Appl. No. 13/424,333, Office Action, dated Mar. 17, 2014.
"Couchbase Server Manual 1.8", Couchbase, pp. 157, Feb. 13, 2012.
"Object Storage Device", Wikipedia, pp. 42, downloaded Apr. 29, 2010.
U.S. Appl. No. 13/830,809, Office Action, dated Aug. 24, 2015.
Final Office Action, App No. 13/830,809 dated Apr. 21, 2016.
Final Office Action App No. 14/253,645 dated Apr. 6, 2016.
Second Office Action, CN Application No. 200780050970.0, dated Jun. 29, 2011.
Application No. PCT/US2011/065927, International Search Report, dated Aug. 28, 2012.
U.S. Appl. No. 14/253,645 Non-Final Office Action dated Aug. 4, 2016.
PCT/US2015/012301 International Preliminary Report on Patentability dated Aug. 4, 2016.
U.S. Appl. No. 14/253,645 Final Office Action dated Feb. 9, 2017.
U.S. Appl. No. 13/830,809 Office Action dated Apr. 21, 2017.
U.S. Appl. No. 13/939,992 Non-Final Office Action dated Apr. 5, 2016.
U.S. Appl. No. 13/939,992 Notice of Allowance dated Jan. 25, 2019.
U.S. Appl. No. 13/830,809 Final Rejection dated Nov. 1, 2017.
U.S. Appl. No. 13/830,809 Non-Final Rejection dated Mar. 12, 2018.
U.S. Appl. No. 13/939,992 Final Rejection dated Dec. 13, 2017.
U.S. Appl. No. 13/939,992 Non-Final Rejection dated Jun. 28, 2018.
U.S. Appl. No. 14/253,645 Final Rejection dated Jan. 30, 2018.
U.S. Appl. No. 14/253,645 Notice of Allowance dated Jun. 6, 2018.
U.S. Appl. No. 13/830,809 Final Rejection dated Oct. 18, 2018.
U.S. Appl. No. 14/253,645 Non-Final Office Action dated Jun. 30, 2017.

* cited by examiner

SYSTEMS AND METHODS FOR STORAGE METADATA MANAGEMENT

TECHNICAL FIELD

This disclosure relates to storage systems and, in particular, to systems and methods for managing persistent, crash-safe storage metadata.

SUMMARY

A computing system may be configured to provide storage services to users. The storage services may include file storage services provided by, inter alia, a file system, database storage services, and the like. The computing system may be configured to maintain persistent metadata pertaining to the storage services, such as a file allocation table and/or the like. When a user performs a storage operation, the computing system may a) store data of the storage operation on a storage device and b) perform one or more additional overhead storage operations to store metadata pertaining to the operation. The overhead storage operations may include storing updates to storage metadata, incrementally allocating logical resources, and the like. The additional storage operations may increase the overhead of input/output (I/O) operations, reduce storage performance, increase wear on the storage device(s), and so on.

Disclosed herein are embodiments of a method for managing storage metadata. Steps of the methods disclosed herein may be implemented by use of machine components, such as a processor of a computing device, non-volatile and/or non-transitory storage devices, and/or the like. In some embodiments, managing storage metadata comprises reserving logical identifiers of a logical address space corresponding to a non-volatile storage device for an object, wherein a storage capacity of the reserved logical identifiers exceeds a capacity requirement of the object, storing data of the object on the non-volatile storage device in a format configured to bind the stored data to respective logical identifiers reserved for the object, identifying logical identifiers of the logical identifiers reserved for the object that are bound to data of the object stored on the non-volatile storage device. The object may be a file system object, and the logical identifiers are reserved for the file system object in response to one of: a request to open a file, a request to open a zero-size file, a request to open a zero-length file, and a request to open an empty file.

The method may further include determining a physical occupancy of the object on the non-volatile storage device by use of metadata stored with data of the object on the non-volatile storage device. The metadata may comprise a persistent trim note configured to invalidate at least a portion of the data of the object stored on the non-volatile storage device. In some embodiments, the method includes determining a physical storage size of the object on the non-volatile storage device based on a number of the identified logical identifiers reserved for the object that are bound to data of the object stored on the non-volatile storage device.

The method may further comprise determining a size of the object based on a physical occupancy of the logical identifiers reserved for the object on the non-volatile storage device and/or determining a size of the object based on an identified range of logical identifiers reserved for the object, wherein the identified range comprises logical identifiers that are assigned to storage addresses of the non-volatile storage device comprising data of the object, wherein the identified range of logical identifiers comprises one or more logical identifiers that are not assigned to storage addresses of the non-volatile storage device.

In some embodiments, the method includes identifying the logical identifiers reserved for the object that are bound to data of the object stored on the non-volatile storage device to a file system for use in reconstructing a file system data structure and/or deferring an update to a persistent file system data structure pertaining to the object in response to storing the data of the object on the non-volatile storage device. The method may also comprise appending one or more packets comprising data of the object to a storage log on the non-volatile storage device, the packets comprising persistent metadata configured to associate data of the packets with respective logical identifiers. Storing the data of the object may comprise storing a data segment of the object with metadata configured to bind the data segment to one of the reserved logical identifiers in one of an atomic write operation on the non-volatile storage device, and a single write operation on the non-volatile storage device.

Disclosed herein are embodiments of an apparatus for managing storage metadata. The apparatus may include an allocation module configured to designate logical block addresses of a logical address space of a non-volatile storage device for use by an entity, wherein a storage capacity represented by the designated logical block addresses exceeds a size of the entity, and a storage layer configured to store data of the entity on respective storage locations of the non-volatile storage device with metadata configured to associate the data with respective logical block addresses designated for use by the entity. The storage layer may be configured to indicate physical storage resources in use by a subset of the designated logical block addresses to reference data of the entity. The apparatus may further comprise a reconstruction module configured to determine the physical storage resources in use by the entity based on a number of storage locations of the non-volatile storage device comprising data of the entity. The reconstruction module may be configured to identify the subset of the designated logical block addresses by accessing data packets comprising data of the entity stored on the non-volatile storage device. In some embodiments, the reconstruction module is configured to reconstruct a forward map comprising entries configured to bind logical identifiers designated for use by the entity to storage addresses of the non-volatile storage device by use of the metadata stored with the data of the entity on the non-volatile storage device.

A file system may be configured to update persistent file system metadata pertaining to the entity based on the physical storage resources in use by the subset of the designated logical block addresses to reference data of the entity indicated by the storage layer. The storage layer may be configured to store the data of the entity in response to one or more storage requests of a storage client, and wherein the storage client is configured to defer an update to persistent metadata pertaining to the entity in response to completion of the one or more storage requests. The storage client may comprise one of: a file system, an operating system, and a database. In some embodiments, the entity is a file, and the allocation module is configured to designate logical block addresses for the file in response to a request pertaining to a zero-length file.

The allocation module may be configured to maintain a sparse logical address space for the non-volatile storage device. The logical capacity of the logical address space may exceed a physical storage capacity of the non-volatile storage device. The allocation module may be configured to select the designated logical block addresses from one of a plurality of allocation regions of a logical address space of the non-volatile storage device, the allocation regions having different respective allocation granularities.

Disclosed herein are embodiments of a system for managing storage metadata. The system may comprise an allocation module configured to reserve identifiers of a logical address space of a non-volatile storage medium for a file, wherein a storage capacity corresponding to the reserved identifiers exceeds a storage requirement of the file, a storage layer configured store metadata on the non-volatile storage medium, the metadata configured to tie data of the file stored on the non-volatile medium with respective identifiers reserved to the file, and a file system configured to restore file system metadata pertaining to the file based on a physical storage occupancy of the reserved identifiers determined by the storage layer. The system may include a reconstruction module configured to generate a forward map comprising ties between one or more of the reserved identifiers and data of the file stored on the non-volatile storage medium by way of the metadata stored on the non-volatile storage medium.

DETAILED DESCRIPTION

Figure 1A:
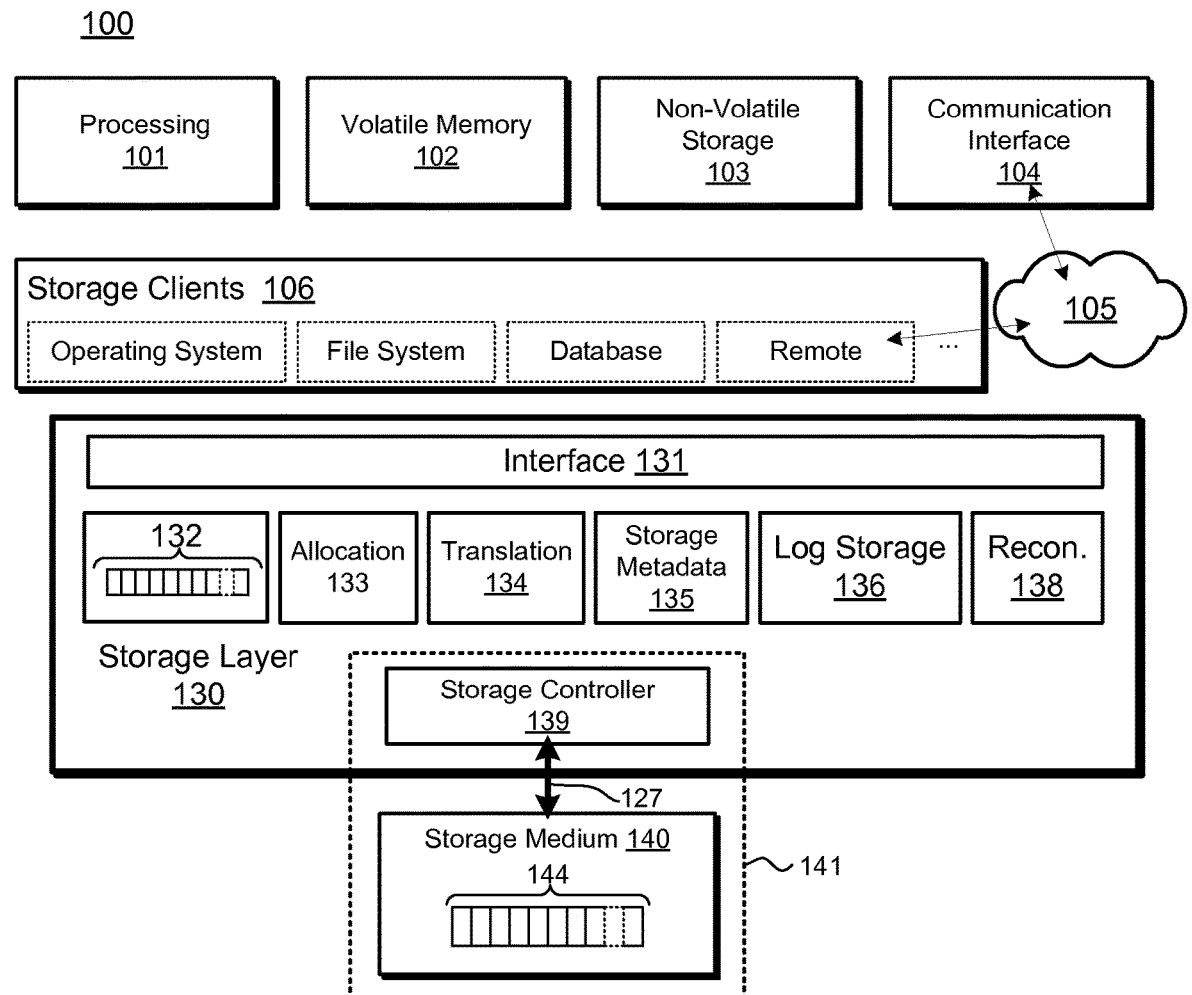
FIG. 1A is a block diagram of one embodiment of a system comprising a storage layer configured to manage storage metadata.

FIG. 1A is a block diagram of one embodiment of a computing system 100 comprising a storage layer 130 configured to provide storage services to one or more storage clients 106. The storage layer 130 may be configured to manage metadata pertaining to storage operations. As disclosed in further detail herein, storage clients 106 may leverage the storage services provided by the storage layer 130 to reduce the overhead of I/O operations, which may include deferring (and/or eliminating) updates to persistent storage data structures that accompany many storage operations.

The computing system 100 may comprise a computing device, such as a server, desktop, laptop, embedded system, mobile device, and/or the like. In some embodiments, the computing system 100 may include multiple computing devices, such as a cluster of server computing devices. The computing system 100 may comprise processing resources 101, volatile memory resources 102 (e.g., random access memory (RAM)), non-volatile storage resources 103, and a communication interface 104. The processing resources 101 may include, but are not limited to, general purpose central processing units (CPUs), application-specific integrated circuits (ASICs), and programmable logic elements, such as field programmable gate arrays (FPGAs), programmable logic arrays (PLGs), and the like. The non-volatile storage resources 103 may comprise a non-transitory machine-readable storage medium, such as a magnetic hard disk, solid-state storage medium, optical storage medium, and/or the like. The communication interface 104 may be configured to communicatively couple the computing system 100 to a network 105. The network 105 may comprise any suitable communication network including, but not limited to, a Transmission Control Protocol/Internet Protocol (TCP/IP) network, a Local Area Network (LAN), a Wide Area Network (WAN), a Virtual Private Network (VPN), a Storage Area Network (SAN), a Public Switched Telephone Network (PSTN), the Internet, and/or the like.

The computing system 100 may comprise a storage layer 130, which may be configured to provide storage services to one or more storage clients 106. The storage clients 106 may include, but are not limited to, operating systems (including bare metal operating systems, guest operating systems, virtual machines, virtualization environments, and the like), file systems, database systems, user-level applications, kernel-level applications, remote storage clients (e.g., storage clients communicatively coupled to the computing system 100 and/or storage layer 130 through the network 105), and/or the like.

The storage layer 130 (and/or modules thereof) may be implemented in software, hardware, or a combination thereof. In some embodiments, portions of the storage layer 130 are embodied as executable instructions, such as computer program code, which may be stored on a persistent, non-transitory storage medium, such as the non-volatile storage resources 103. The instructions and/or computer program code may be configured for execution by the processing resources 101. Alternatively, or in addition, portions of the storage layer 130 may be embodied as machine components, such as general and/or application-specific components, programmable hardware, FPGAs, ASICs, hardware controllers, storage controllers, and/or the like.

The storage layer 130 may be configured to perform storage operations on a storage medium 140. The storage medium 140 may comprise any storage medium capable of storing data persistently. As used herein, "persistent" data storage refers to storing information on a medium capable of retaining the data. A persistent data storage may, therefore, refer to non-volatile and/or non-transitory data storage. The storage medium 140 may include non-volatile storage media such as solid-state storage media in one or more solid-state storage devices or drives (SSD), hard disk drives (e.g., Integrated Drive Electronics (IDE) drives, Small Computer System Interface (SCSI) drives, Serial Attached SCSI (SAS) drives, Serial AT Attachment (SATA) drives, etc.), tape drives, writable optical drives (e.g., CD drives, DVD drives, Blu-ray drives, etc.), and/or the like.

In some embodiments, the storage medium 140 comprises non-volatile solid-state memory, which may include, but is not limited to, NAND flash memory, NOR flash memory, nano RAM (NRAM), magneto-resistive RAM (MRAM), phase change RAM (PRAM), Racetrack memory, Memristor memory, nanocrystal wire-based memory, silicon-oxide based sub-10 nanometer process memory, graphene memory, Silicon-Oxide-Nitride-Oxide-Silicon (SONOS), resistive random-access memory (RRAM), programmable metallization cell (PMC), conductive-bridging RAM (CBRAM), and/or the like. Although particular embodiments of the storage medium 140 are disclosed herein, the teachings of this disclosure could be applied to any suitable form of memory including both non-volatile and volatile forms. Accordingly, although particular embodiments of the storage layer 130 are disclosed in the context of non-volatile, solid-state storage devices 140, the storage layer 130 may be used with other storage devices and/or storage media.

In some embodiments, the storage medium 140 includes volatile memory, which may include, but is not limited to, RAM, dynamic RAM (DRAM), static RAM (SRAM), synchronous dynamic RAM (SDRAM), etc. The storage medium 140 may correspond to memory of the processing resources 101, such as a CPU cache (e.g., L1, L2, L3 cache, etc.), graphics memory, and/or the like. In some embodiments, the storage medium 140 is communicatively coupled to the storage layer 130 by use of an interconnect 127. The interconnect 127 may include, but is not limited to, peripheral component interconnect (PCI), PCI express (PCI-e), serial advanced technology attachment (serial ATA or SATA), parallel ATA (PATA), small computer system interface (SCSI), IEEE 1394 (FireWire), Fiber Channel, universal serial bus (USB), and/or the like. Alternatively, the storage medium 140 may be a remote storage device that is communicatively coupled to the storage layer 130 through the network 105 (and/or another communication interface, such as a Storage Area Network (SAN), a Virtual Storage Area Network (VSAN), and/or the like). The interconnect 127 may, therefore, comprise a remote bus, such as a PCE-e bus, a network connection (e.g., Infiniband), a storage network, Fibre Channel Protocol (FCP) network, HyperSCSI, and/or the like.

The storage layer 130 may be configured to manage storage operations on the storage medium 140 by use of, inter alia, a storage controller 139. The storage layer 130, and the modules thereof, may comprise software and/or hardware components including, but not limited to, one or more drivers and/or other software modules operating on the computing system 100, such as storage drivers, I/O drivers, filter drivers, and/or the like; hardware components, such as hardware controllers, communication interfaces, and/or the like; and so on. The storage medium 140 may be embodied on a storage device 141. Portions of the storage layer 130 and/or the modules thereof (e.g., storage controller 139) may be implemented as hardware and/or software components (e.g., firmware) of the storage device 141. Alternatively, the storage layer 130 and/or the modules thereof (e.g., storage controller 139) may be implemented as hardware and/or software components of the computing system 100.

The storage controller 139 may be configured to implement storage operations at particular storage locations of the storage medium 140. As used herein, a storage location refers to a unit of storage of a storage resource (e.g., a storage medium and/or device) that is capable of storing data persistently; storage locations may include, but are not limited to, pages, groups of pages (e.g., logical pages and/or offsets within a logical page), storage divisions (e.g., physical erase blocks, logical erase blocks, etc.), sectors, locations on a magnetic disk, battery-backed memory locations, and/or the like. The storage locations may be addressable within a storage address space 144 of the storage medium 140. Storage addresses may correspond to physical addresses, media addresses, back-end addresses, address offsets, and/or the like. Storage addresses may correspond to any suitable storage address space 144, storage addressing scheme, and/or arrangement of storage locations.

The storage layer 130 may comprise an interface 131 through which storage clients 106 may access storage services provided by the storage layer 130. The interface 131 of the storage layer 130 may include one or more of a block device interface, a virtualized storage interface, one or more virtual storage units (VSUs), an object storage interface, a database storage interface, a metadata interface, and/or another suitable interface and/or an Application Programming Interface (API). The interface 131 may be configured to provide information pertaining to objects stored on the storage medium 140, such as files, file system metadata (e.g., directories, inodes, device nodes, sockets, pipes, file streams, file tables, file indexes, and the like), database information, and/or the like. The information provided through the interface may include, but is not limited to: object resource allocation information, the actual size and/or extent of an object as stored on the storage medium 140, and the like. In some embodiments, storage clients 106 may leverage the storage layer 130 to defer and/or eliminate updates to internal storage data structures. In one embodiment, for example, a file system storage client 106 may defer and/or eliminate updates to file data structures (e.g., a file allocation table) that typically accompany file storage operations. The file system storage client 106 may instead rely on the storage layer 130 to provide information regarding the occupancy of the file on the storage medium 140 (e.g., the actual size, length, and/or extent of the file).

The storage layer 130 may provide for referencing storage resources through a front-end storage interface. As used herein, a "front-end storage interface" refers to an interface and/or a namespace through which storage clients 106 may refer to storage resources of the storage layer 130. A storage interface may correspond to a logical address space 132. The logical address space 132 may comprise a group, set, collection, range, and/or extent of identifiers. As used herein, an "identifier" or a "logical identifier" (LID) refers to an identifier for referencing a source resource; LIDs may include, but are not limited to, names (e.g., file names, distinguished names, and/or the like), data identifiers, references, links, LIDs, front-end identifiers, logical addresses, logical block addresses (LBAs), logical unit number (LUN) addresses, virtual unit number (VUN) addresses, virtual storage addresses, storage addresses, physical addresses, media addresses, back-end addresses, and/or the like.

The logical capacity of the logical address space 132 may correspond to the number of LIDs in the logical address space 132 and/or the size and/or granularity of the storage resources referenced by the LIDs. In some embodiments, the logical address space 132 may be "thinly provisioned." As used herein, a thinly provisioned logical address space 132 refers to a logical address space 132 having a logical capacity that exceeds the physical storage capacity of the underlying storage resources (e.g., exceeds the storage capacity of the storage medium 140). In one embodiment, the storage layer 130 is configured to provide a 64-bit logical address space 132 (e.g., a logical address space comprising $2^{26}$ unique LIDs), which may exceed the physical storage capacity of the storage medium 140. The large, thinly provisioned logical address space 132 may allow storage clients 106 to efficiently reserve contiguous ranges of LIDs, while reducing the chance of naming conflicts.

The translation module 134 of the storage layer 130 may be configured to map LIDs of the logical address space 132 to storage resources (e.g., data stored within the storage address space 144 of the storage medium 140). The logical address space 132 may be independent of the back-end storage resources (e.g., the storage medium 140); accordingly, there may be no set or pre-determined mappings between LIDs of the logical address space 132 and the storage addresses of the storage address space 144. In some embodiments, the logical address space 132 is sparse, thinly provisioned, and/or over-provisioned, such that the size of the logical address space 132 differs from the storage address space 144 of the storage medium 140.

The storage layer 130 may be configured to maintain storage metadata 135 pertaining to storage operations performed on the storage medium 140. The storage metadata 135 may include, but is not limited to, a forward map comprising any-to-any mappings between LIDs of the logical address space 132 and storage locations and/or storage addresses within the storage address space 144, a reverse map pertaining to the contents of storage locations of the storage medium 140, validity bitmaps, reliability testing and/or status metadata, status information (e.g., error rate, retirement status, and so on), cache metadata, and/or the like. Portions of the storage metadata 135 may be maintained within the volatile memory resources 102 of the computing system 100. Alternatively, or in addition, portions of the storage metadata 135 may be stored on non-volatile storage resources 103 and/or the storage medium 140.

Portions of the storage metadata 135 may be maintained in volatile memory resources 102 of the computing system. However, and as disclosed herein, the storage metadata 135 maintained by the storage layer 130 may be persistent, and crash-safe due to, inter alia, the contextual, log-based storage format of the data stored on the storage medium 140 by use of the log storage module 136. The storage layer 130 may comprise a reconstruction module 138 configured to reconstruct the storage metadata 135 from the contents of the storage device 141. The reconstruction module 138 may be configured to reconstruct the storage metadata 135 in response to a failure condition that results in the loss and/or corruption of portions of the storage metadata 135.

Figure 1B:
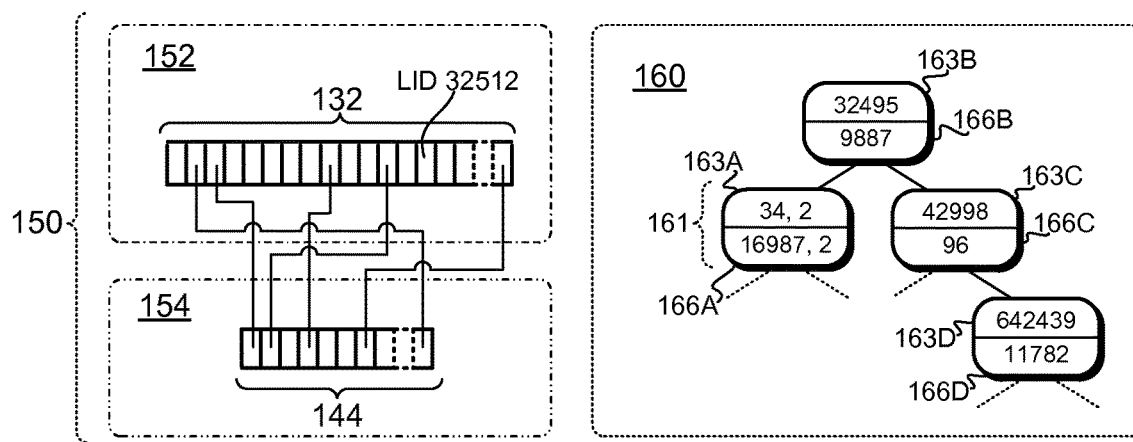
FIG. 1B depicts embodiments of storage metadata.

FIG. 1B depicts one embodiment of any-to-any mappings 150 between LIDs of the logical address space 132 and storage resources (e.g., storage addresses within the storage address space 144). The any-to-any mappings 150 may be maintained in one or more data structures of the storage metadata 135, including, but not limited to, a forward map 160. As illustrated in FIG. 1B, the translation module 134 may be configured to map any identifier (any LID) to any storage location. As further illustrated, the logical address space 132 may be sized differently from the underlying storage address space 144. In the FIG. 1B embodiment, the logical address space 132 may be thinly provisioned and, as such, may comprise a larger range of LIDs than the range of storage addresses in the storage address space 144.

As disclosed above, storage clients 106 may reference storage resources through the LIDs of the logical address space 132. Accordingly, the logical address space 132 may correspond to a logical interface 152 of the storage resources, and the mappings to particular storage addresses within the storage address space 144 may correspond to a back-end interface 154 of the storage resources.

The storage layer 130 may be configured to maintain the any-to-any mappings 150 between the logical interface 152 and back-end interface 154 within, inter alia, a forward map 160. The forward map 160 may comprise any suitable data structure, including, but not limited to, an index, a map, a hash map, a hash table, a tree, a range-encoded tree, a b-tree, and/or the like. The forward map 160 may comprise entries 161 corresponding to LIDs that are currently in use to reference data stored on the storage medium 140. The entries 161 of the forward map 160 may associate LIDs 163A-D with respective storage addresses 166A-D within the storage address space 144. The forward map 160 may be sparsely populated and, as such, may omit entries corresponding to LIDs that are not currently in use to reference data on the storage medium 140. Accordingly, LIDs that exist within the forward map 160 correspond to data stored on the storage medium 140, and LIDs that do not exist in the forward map 160 are not currently in use to reference data stored on the storage medium 140. As used herein, a LID "exists" in the forward map 160 if the forward map 160 comprises an entry 161 corresponding to the LID, such as an entry 161 corresponding to the LID (e.g., LID 32495, 42998, or 642439) and/or an entry 161 corresponding to a LID collection, range, and/or extent that includes the LID. For example, the LID range 163A includes LIDs 34 and 35, and as such, both LIDs 34 and 35 exist in the forward map 160.

In some embodiments, the forward map 160 comprises a range-encoded data structure, such that one or more of the entries 161 may correspond to a plurality of LIDs (e.g., a range, an extent, and/or a set of LIDs). In the FIG. 1B embodiment, the forward map 160 includes an entry 161 corresponding to a range of LIDs 163A mapped to a corresponding range of storage addresses 166A. The entries 161 may be indexed by LIDs. In the FIG. 1B embodiment, the entries 161 are arranged into a tree data structure by respective links. The disclosure is not limited in this regard, however, and could be adapted to use any suitable data structure and/or indexing mechanism.

The storage layer 130 may comprise an allocation module 133 that is configured to manage allocation of the logical address space 132. The allocation module 133 may reserve LIDs of the logical address space 132 for use with respective storage objects. As used herein, a storage object refers to data configured for storage on the storage medium 140. Storage objects may include, but are not limited to: objects, entities, storage entities, data structures, files, file collections, file system metadata and/or objects (e.g., file metadata, directories, inodes, device nodes, sockets, pipes, file streams, file tables, file indexes, and the like), database information (e.g., database primitives, database objects, tables, values, elements, attributes, and the like), data streams, and so on. The allocation module 133 may be configured to manage LID reservations, provisioning, and/or allocation using the storage metadata 135, including the forward map 160. Inclusion of LIDs within the forward map 160 may indicate that the LID has been allocated for use by a storage client 106 and is currently in use to reference data of the storage client 106 stored on the storage medium 140. LIDs that do not exist within the forward map 160 may not be currently in use to reference valid data on the storage medium 140. In some embodiments, the allocation module 133 may be configured to maintain a separate reservation data structure configured to manage LIDs that have been designated and/or reserved for use by a particular storage client 106, but are not currently in use to reference data stored on the storage medium 140. Further embodiments of systems and methods for managing storage resource allocations are disclosed in U.S. patent application Ser. No. 13/865,153 entitled, "Systems and Methods for Storage Allocation," filed Apr. 17, 2013 for David Flynn et al., which is hereby incorporated by reference.

Figure 1C:
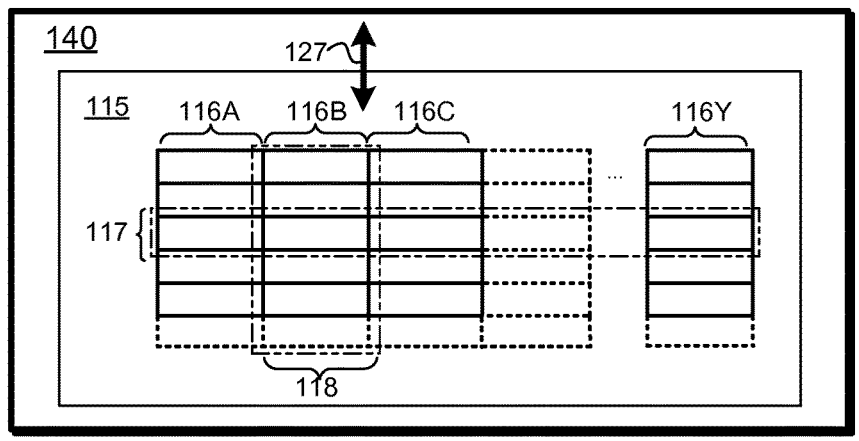
FIG. 1C is a block diagram depicting one embodiment of a storage array.

Referring to FIG. 1C, in some embodiments, the storage medium 140 may comprise a solid-state storage array 115 comprising a plurality of solid-state storage elements 116A-Y. As used herein, a solid-state storage array (or storage array) 115 refers to a set of two or more independent columns 118. A column 118 may comprise one or more solid-state storage elements 116A-Y that are communicatively coupled to the storage layer 130 in parallel using, inter alia, the interconnect 127. Rows 117 of the array 115 may comprise physical storage units of the respective columns 118 (solid-state storage elements 116A-Y). As used herein, a solid-state storage element 116A-Y includes, but is not limited to, solid-state storage resources embodied as a package, chip, die, plane, printed circuit board, and/or the like. The solid-state storage elements 116A-Y comprising the array 115 may be capable of independent operation. Accordingly, a first one of the solid-state storage elements 116A may be capable of performing a first storage operation while a second solid-state storage element 116B performs a different storage operation. For example, the solid-state storage element 116A may be configured to read data at a first physical address, while another solid-state storage element 116B reads data at a different physical address.

A solid-state storage array 115 may also be referred to as a logical storage element (LSE). As disclosed in further detail herein, the solid-state storage array 115 may comprise logical storage units (rows 117). As used herein, a "logical storage unit" or row 117 refers to a combination of two or more physical storage units, each physical storage unit on a respective column 118 of the array 115. A logical erase block refers to a set of two or more physical erase blocks, a logical page refers to a set of two or more pages, and so on. In some embodiments, a logical erase block may comprise erase blocks within respective logical storage elements 115 and/or banks. Alternatively, a logical erase block may comprise erase blocks within a plurality of different arrays 115 and/or may span multiple banks of solid-state storage elements.

Referring back to FIG. 1A, the storage layer 130 may further comprise a log storage module 136 configured to store data on the storage medium 140 in a log structured storage configuration (e.g., in a storage log). As used herein, a "storage log" or "log structure" refers to an ordered arrangement of data within the storage address space 144 of the storage medium 140. Data in the storage log may comprise and/or be associated with persistent metadata. Accordingly, the storage layer 130 may be configured to store data in a contextual, self-describing format. As used herein, a contextual or self-describing format refers to a data format in which data is stored in association with persistent metadata. In some embodiments, the persistent metadata may be configured to identify the data and, as such, may comprise and/or reference the logical interface of the data (e.g., may comprise the LID(s) associated with the data). The persistent metadata may include other information, including, but not limited to, information pertaining to the owner of the data, access controls, data type, relative position or offset of the data, information pertaining to storage operation(s) associated with the data (e.g., atomic storage operations, transactions, and/or the like), log sequence information, data storage parameters (e.g., compression algorithm, encryption, etc.), and/or the like.

Figure 1D:
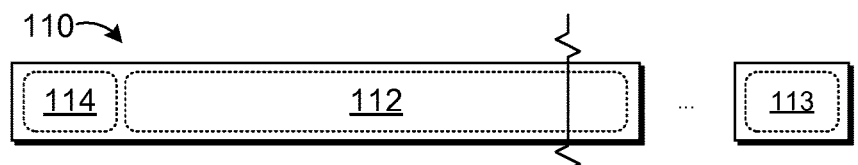
FIG. 1D depicts one embodiment of a data packet format.

FIG. 1D illustrates one embodiment of a contextual data format. The FIG. 1D embodiment depicts a packet format 110, which includes a data segment 112 and persistent metadata 114. Although FIG. 1D depicts a packet format 110, the disclosure is not limited in this regard and could be adapted to associate data (e.g., data segment 112) with contextual metadata in other ways including, but not limited to, an index on the storage medium 140, a dedicated metadata storage channel, and/or the like. Data packets 110 may be associated with sequence information 113.

The data segment 112 may be of any arbitrary length and/or size. The persistent metadata 114 may be embodied as one or more header fields of the data packet 110. The persistent metadata 114 may comprise the logical interface of the data segment 112 and, as such, may include the LID(s) associated with the data segment 112. Accordingly, the persistent metadata 114 may be configured to bind the data segment 112 to the LIDs corresponding to the data segment 112. As disclosed in further detail herein, the contextual format of data stored on the storage medium 140 may enable the reconstruction module 138 of the storage layer 130 to rebuild the storage metadata 135 from the contents of the storage device 141. Rebuilding the storage metadata 135 may comprise reconstructing the assignments between LIDs of the logical address space 132 and storage locations on the storage medium 140 of the forward map 160.

The sequence information 113 associated with a data packet 110 may be used to determine the relative order of the data packet 110 within the storage log. In some embodiments, data packets are appended sequentially within storage divisions of the storage medium 140. The storage divisions may correspond to erase blocks, logical erase blocks, or the like. Each storage division may be capable of storing a large number of data packets 110. The relative position of the data packets 110 within a storage division may determine the order of the data packets 110 within the storage log on the storage medium 140. The order of the storage divisions may be determined, inter alia, by storage division sequence information 113. Storage divisions may be assigned respective sequence information 113 at the time the storage division is initialized for use (e.g., erased), programmed, closed, or the like. The storage division sequence information 113 may determine an ordered sequence of storage divisions within the storage address space 144. Accordingly, the relative order of a data packet 110 within the storage log may be determined by: a) the relative position of the data packet 110 within a particular storage division, and b) the order of the storage division relative to other storage divisions in the storage address space 144.

The log storage module 136 may use the data packet format 110 of FIG. 1D to store data segments 112 with corresponding persistent metadata 114 in a single storage operation (e.g., in the same write and/or program operation on the storage medium 140). Writing the data segment 112 together with the persistent metadata 114 may ensure that the binding between the data segment 112 and the persistent metadata 114 is not lost when the data is written to the non-volatile storage device 141. In some embodiments, the data segments 112 and persistent metadata 114 are stored together in an atomic storage operation, which may comprise streaming the data segment 112 and persistent metadata 114 into program buffer(s) of the storage medium 140, and programming the data segment 112 and persistent metadata 114 together, in a single program operation. In some embodiments, the data segment 112 and persistent metadata 114 may be included in the same ECC data structures. Further embodiments of systems and methods for storing and/or associating data segments 112 with persistent metadata 114 on a storage medium 140 are disclosed in U.S. patent application Ser. No. 13/784,705 entitled "Systems and Methods for Adaptive Storage," filed on Mar. 4, 2013 for David Flynn et al., which is hereby incorporated by reference.

In some embodiments, the storage layer 130 may be configured to manage an asymmetric, write-once storage medium 140, such as a solid-state storage medium, a flash storage medium, or the like. As used herein, a "write once" storage medium refers to a storage medium that is reinitialized (e.g., erased) each time new data is written or programmed thereon. As used herein, an "asymmetric" storage medium refers to a storage medium that has different latencies for different types of storage operations. In some embodiments, for example, read operations may be faster than write/program operations, and write/program operations may be much faster than erase operations (e.g., reading the media may be hundreds of times faster than erasing, and tens of times faster than programming the storage medium). The storage medium 140 may be partitioned into storage divisions that can be erased as a group (e.g., erase blocks). As such, modifying a single data segment "in-place" may require erasing the entire erase block comprising the data and rewriting the modified data to the erase block, along with the original, unchanged data. This may result in inefficient "write amplification," which may excessively wear the media. In some embodiments, therefore, the storage layer 130 may be configured to write data "out-of-place." As used herein, writing data "out-of-place" refers to updating and/or overwriting data at different storage location(s) rather than overwriting the data "in-place" (e.g., overwriting the original physical storage location of the data). Updating and/or overwriting data out-of-place may avoid write amplification, since existing, valid data on the erase block with the data to be modified need not be erased and recopied. Moreover, writing data out-of-place may remove erasure from the latency path of many storage operations, such that erasure latency is not part of the "critical path" of write operations.

Figure 1E:
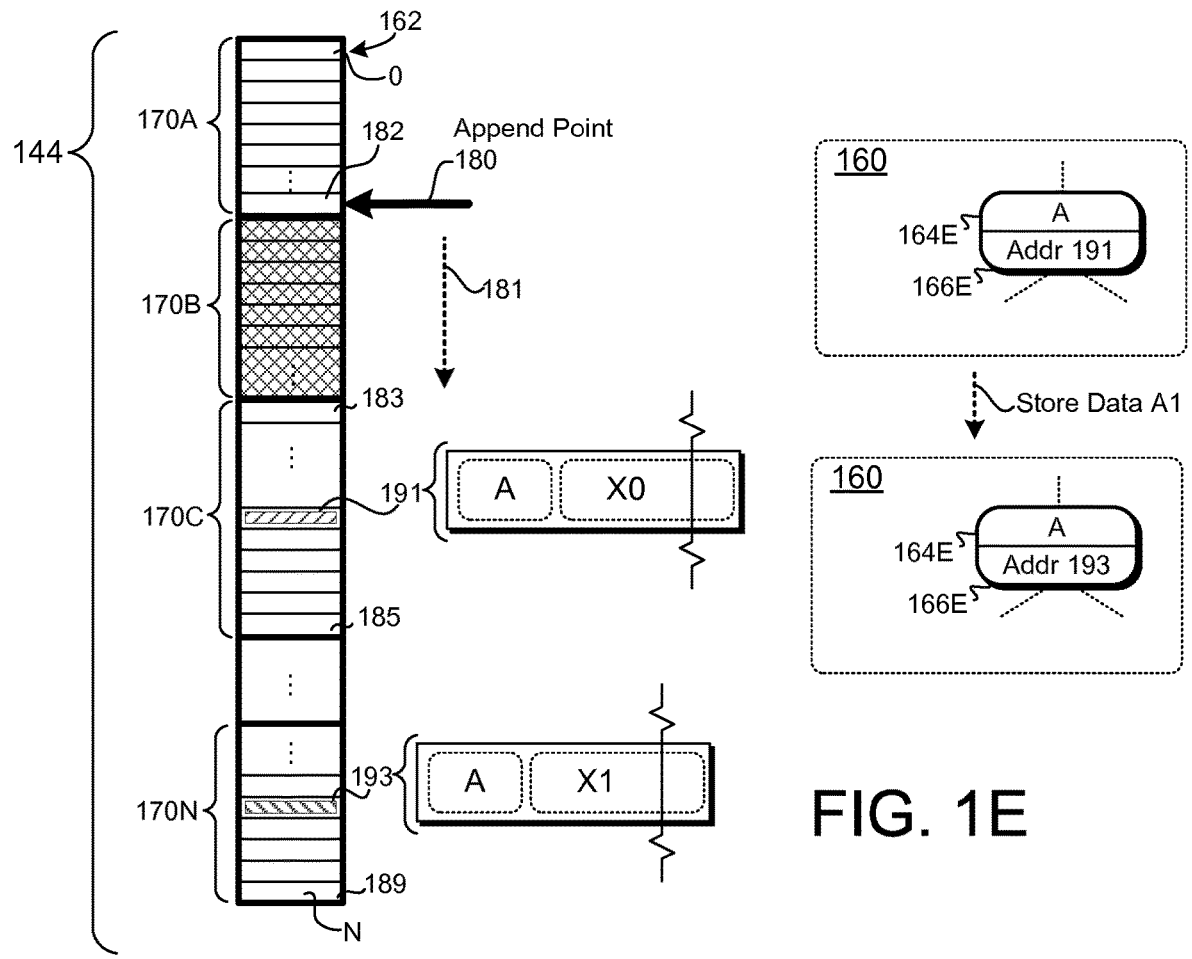
FIG. 1E depicts one embodiment of a storage log.

The storage layer 130 may be configured to perform storage operations out-of-place by use of, inter alia, the log storage module 136. The log storage module 136 may be configured to append data at a current append point within the storage address space 144 in a manner that maintains the relative order of storage operations performed by the storage layer 130, forming a "storage log" on the storage medium 140. FIG. 1E depicts one embodiment of append-only storage operations performed within the storage address space 144 of the storage medium 140. As disclosed above, the storage address space 144 comprises a plurality of storage divisions 170A-N (e.g., erase blocks, logical erase blocks, or the like), each of which can be initialized for use in storing data (e.g., erased). The storage divisions 170A-N may comprise respective storage locations, which may correspond to pages, logical pages, and/or the like, as disclosed herein. The storage locations may be assigned respective storage addresses (e.g., storage address 0 to storage address N).

The log storage module 136 may be configured to store data sequentially from an append point 180 within the physical address space 144. In the FIG. 1E embodiment, data may be appended at the append point 180 within storage location 182 of storage division 170A and, when the storage location 182 is filled, the append point 180 may advance 181 to a next available storage location. As used herein, an "available" storage location refers to a storage location that has been initialized and has not yet been programmed (e.g., has been erased). As disclosed above, some types of storage media can only be reliably programmed once after erasure. Accordingly, an available storage location may refer to a storage location within a storage division 170A-N that is in an initialized (or erased) state.

In the FIG. 1E embodiment, the logical erase block 170B may be unavailable for storage due to, inter alia, not being in an erased state (e.g., comprising valid data), being out of service due to high error rates, or the like. Therefore, after filling the storage location 182, the log storage module 136 may skip the unavailable storage division 170B, and advance the append point 180 to the next available storage division 170C. The log storage module 136 may be configured to continue appending data to storage locations 183-185, at which point the append point 180 continues at a next available storage division 170A-N, as disclosed above.

After storing data on the "last" storage location within the storage address space 144 (e.g., storage location N 189 of storage division 170N), the log storage module 136 may advance the append point 180 by wrapping back to the first storage division 170A (or the next available storage division, if storage division 170A is unavailable). Accordingly, the log storage module 136 may treat the storage address space 144 as a loop or cycle.

As disclosed above, sequentially appending data within the storage address space 144 may generate a storage log on the storage medium 140. In the FIG. 1E embodiment, the storage log may comprise the ordered sequence of storage operations performed by sequentially storing data packets (and/or other data structures) from the append point 180 within the storage address space 144. The append-only storage format may be used to modify and/or overwrite data out-of-place, as disclosed above. Performing storage operations out-of-place may avoid write amplification, since existing valid data on the storage divisions 170A-N comprising the data that is being modified and/or overwritten need not be erased and/or recopied. Moreover, writing data out-of-place may remove erasure from the latency path of many storage operations (the erasure latency is no longer part of the "critical path" of a write operation).

In the FIG. 1E embodiment, a data segment X0 corresponding to LID A may be stored at storage location 191. The data segment X0 may be stored in the self-describing packet format 110, disclosed above. The data segment 112 of the packet 110 may comprise the data segment X0, and the persistent metadata 114 may comprise the LID(s) associated with the data segment (e.g., the LID A). A storage client 106 may request an operation to modify and/or overwrite the data associated with the LID A, which may comprise replacing the data segment X0 with data segment X1. The storage layer 130 may perform this operation out-of-place by appending a new packet 110 comprising the data segment X1 at a different storage location 193 on the storage medium 140, rather than modifying the existing data packet 110, in place, at storage location 191. The storage operation may further comprise updating the storage metadata 135 to associate the LID A with the storage address of storage location 193 and/or to invalidate the obsolete data X0 at storage location 191. As illustrated in FIG. 1E, updating the storage metadata 135 may comprise updating an entry of the forward map 160 to associate the LID A 163E with the storage address of the modified data segment X1.

Performing storage operations out-of-place (e.g., appending data to the storage log) may result in obsolete or invalid data remaining on the storage medium 140 (e.g., data that has been erased, modified, and/or overwritten out-of-place). As illustrated in FIG. 1E, modifying the data of LID A by appending the data segment X1 to the storage log as opposed to overwriting and/or replacing the data segment X0 in place at storage location 191 results in keeping the obsolete version of the data segment X0 on the storage medium 140. The obsolete version of the data segment X0 may not be immediately removed from the storage medium 140 (e.g., erased), since, as disclosed above, erasing the data segment X0 may involve erasing an entire storage division 170A and/or relocating valid data on the storage division 170A, which is a time-consuming operation and may result in write amplification. Similarly, data that is no longer is use (e.g., deleted or subject to a TRIM operation) may not be immediately removed. As such, over time, the storage medium 140 may accumulate a significant amount of "invalid" data.

The storage layer 130 may identify invalid data, such as the data segment X0 at storage location 191, by use of the storage metadata 135 (e.g., the forward map 160). The storage layer 130 may determine that storage locations that are not associated with valid identifiers (LIDs) in the forward map 160 comprise data that does not need to be retained on the storage medium 140. Alternatively, or in addition, the storage layer 130 may maintain other storage metadata 135, such as validity bitmaps, reverse maps, and/or the like to efficiently identify data that has been deleted, has been TRIMed, is obsolete, and/or is otherwise invalid.

The storage layer 130 may be configured to reclaim storage resources occupied by invalid data. The storage layer 130 may be further configured to perform other media management operations (e.g., grooming operations), which may include, but are not limited to: reclaiming storage resources, refreshing data stored on the storage medium 140 (to prevent error conditions due to data degradation, write disturb, read disturb, and/or the like), monitoring media reliability conditions, wear leveling, and/or the like. As used herein, reclaiming a storage resource, such as a storage division 170A-N, refers to erasing the storage division 170A-N so that new data may be stored/programmed thereon. Reclaiming a storage division 170A-N may comprise relocating valid data on the storage division 170A-N to a new storage location. The storage layer 130 may identify storage divisions 170A-N for reclamation based upon one or more factors, which may include, but are not limited to, the amount of invalid data in the storage division 170A-N, the amount of valid data in the storage division 170A-N, wear levels (e.g., number of program/erase cycles), time since the storage division 170A-N was programmed or refreshed, and so on.

As disclosed above, the storage layer 130 may comprise a reconstruction module 138 configured to reconstruct the storage metadata 135, including the forward map 160, by use of contents of the storage log on the storage medium 140. In the FIG. 1E embodiment, the current version of the data associated with LID A may be determined based on the relative log order of the data packets 110 at storage locations 191 and 193, respectively. Since the data packet at storage location 193 is ordered after the data packet at storage location 191 in the storage log, the storage layer 130 may determine that storage location 193 comprises the most recent, up-to-date version of the data corresponding to LID A. The storage layer 130 may reconstruct the forward map 160 to associate the LID A with the data packet at storage location 193 (rather than the obsolete data at storage location 191).

Referring back to FIG. 1A, the storage layer 130 may be configured to provide status information pertaining to LIDs of the logical address space 132. The storage layer 130 may be configured to provide LID status in response to requests received via the interface 131. Alternatively, or in addition, the storage layer 130 may be configured to publish LID status information to storage clients 106 using a call-back interface, push interface, publication interface, and/or the like. The LID status information provided by the storage layer may include, but is not limited to: whether the LID is currently in use to reference data stored on the storage medium 140, whether the LID exists within the forward map 160, the physical storage occupancy of the LID, the physical storage resources in use by the LID, and so on. The storage layer 130 may be configured to provide status information pertaining to a particular LID, a collection of LIDs, a LID range, a LID extent, and/or the like.

The storage layer 130 may determine LID status information by use of the persistent, crash-safe storage metadata 135, such as the forward map 160. The LID status information may include, but is not limited to: a) whether the LID exists in the forward map 160, b) whether the LID is currently in use to reference data stored on the non-volatile storage device 141, c) the physical storage resources occupied by the LID (if any), d) the physical storage size corresponding to the LID, and so on.

As disclosed herein, the forward map 160 is configured to maintain associations between LIDs and data stored on the non-volatile storage device 141. Referring to FIG. 1B, associations between LIDs and storage addresses may be represented in respective entries 161 of the forward map 160. The entries may tie, bind, and/or assign one or more LIDs to data stored at a particular storage address within the storage address space 144 of the storage medium 140. LIDs that exist in the forward map 160 are bound to stored data and, as such, represent physical storage resource usage. LIDs that do not exist in the forward map 160 are not tied to storage addresses and, as such, do not represent usage of physical storage resources. Accordingly, the LID status information provided by the storage layer 130 may correspond to whether the LID "exists" within the forward map 160. As disclosed above, a LID exists in the forward map 160 if the forward map 160 binds, ties, and/or assigns the LID to a data stored on the non-volatile storage device 141, such that the forward map 160 includes an entry 161 for the particular LID and/or an entry 161 comprising a collection, a range, and/or an extent that includes the LID.

As illustrated in FIG. 1B, the LID 32495 (163B) exists in the forward map 160, the LID 32495 is tied, bound, and/or assigned to data stored within the storage location at storage address 9887. Accordingly, the LID 32495 currently occupies physical storage resources of the non-volatile storage device 141 (data bound to the LID 32495 occupies the storage location at storage address 9887). Therefore, based on the existence of LID 32495 within the forward map 160, the storage layer 130 may determine that the LID 32495 is currently in use to reference data stored on the storage medium 140; is currently assigned to a storage location (e.g., at the specified storage address); is tied, bound, and/or assigned to stored data; currently occupies physical storage resources; and/or represents usage of physical storage resources. As disclosed above, the physical storage resources represented by a LID in the forward map 160, such as the LID 32495, may correspond to the size of the storage locations of the storage medium 140, a sector size, a block size, the size of the data segments 112, and/or the like.

LIDs that do not exist in the forward map 160 are not tied, bound, and/or assigned to storage addresses of the storage medium 140 and, as such, do not occupy physical storage resources or represent usage of physical storage resources. In FIG. 1B, LID 32512 does not exist in the forward map 160, and as such, the storage layer 130 may determine that LID 32512 is not currently in use to reference data stored on the storage medium 140; is not tied, bound, and/or assigned to a storage address; does not occupy physical storage resources; and/or does not represent usage of physical storage resources.

The storage layer 130 may be further configured to provide the status of LID collections, ranges, and/or extents. The physical occupancy of a LID range may correspond to the number of LIDs within the specified range that exists in the forward map 160. In the FIG. 1B embodiment, the physical occupancy of the LID range 34-128 corresponds to LIDs 34 and 35, since the other LIDs 36-128 in the designated range do not exist in the forward map 160. Accordingly, the physical occupancy of the LID range 34-128 (and/or physical storage size of a storage object corresponding to the designated LID range) may be equivalent to two storage locations of the non-volatile storage device 141. Storage clients 106 may access the LID status information disclosed herein to delegate storage metadata management operations to the storage layer 130. In one embodiment, a storage client 106 may leverage LID status information provided by the storage layer 130 to obviate the need for the storage client 106 to maintain the status of LIDs reserved to storage objects of the storage client 106, determine the actual physical size of the storage object on the storage medium 140, and the like. Moreover, since the forward map 160 used to determine the LID status information is persistent and crash safe, the storage client 106 may defer (and/or eliminate) updates to internal, persistent metadata pertaining to the storage objects of the storage client 106.

Figure 2:
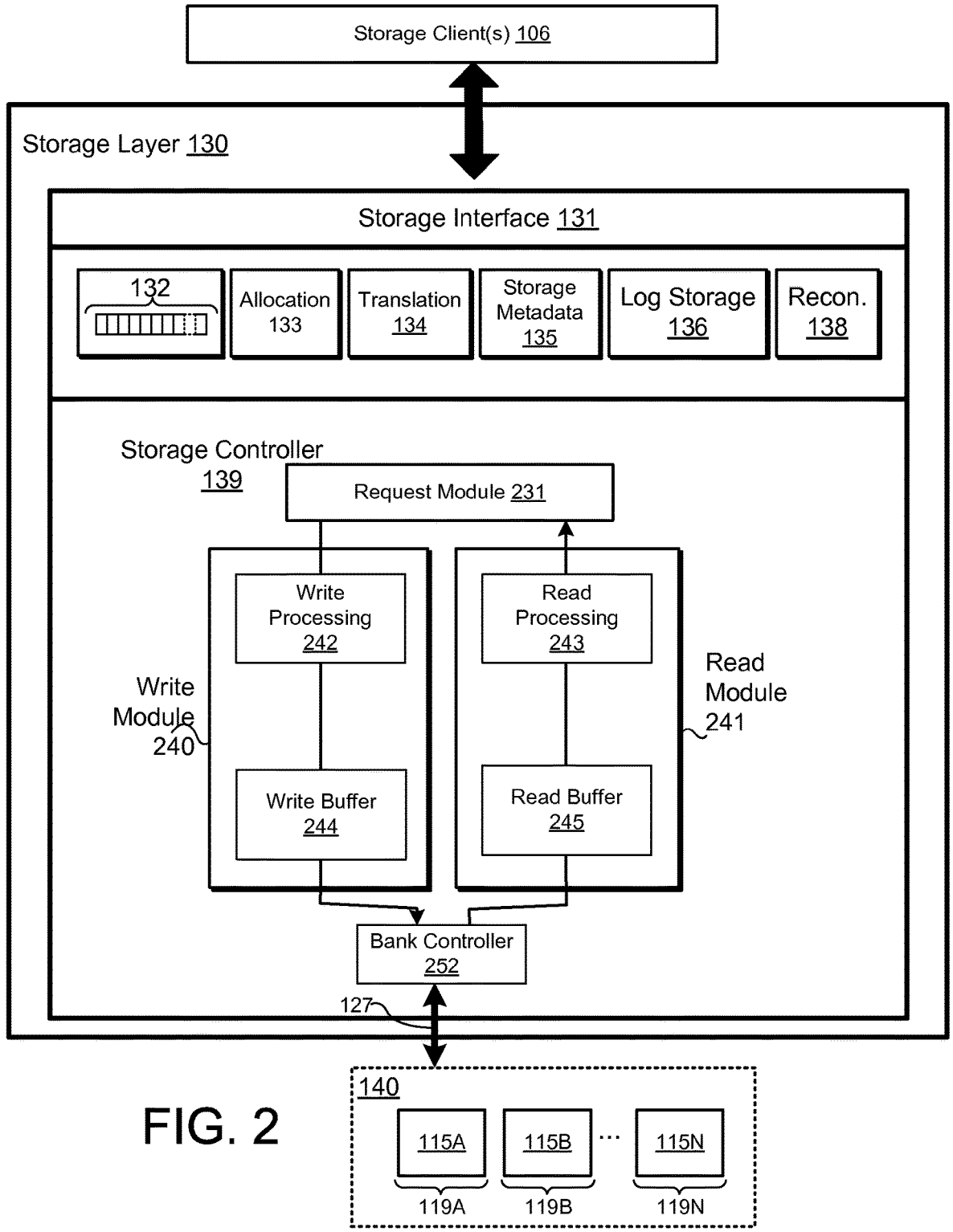
FIG. 2 is a block diagram of another embodiment of a system comprising a storage layer configured to manage storage metadata.

FIG. 2 depicts another embodiment of a system 200 comprising a storage layer 130. The storage medium 140 may comprise a plurality of independent banks 119A-N, each of which may comprise one or more storage arrays 115A-N. Each independent bank 119A-N may be coupled to the storage controller 139 via the interconnect 127.

The storage controller 139 may comprise a storage request receiver module 231 configured to receive storage requests from the storage layer 130 via an interconnect 127. The storage request receiver module 231 may be further configured to transfer data to/from the storage layer 130 and/or storage clients 106. Accordingly, the storage request receiver module 231 may comprise one or more direct memory access (DMA) modules, remote DMA modules, bus controllers, bridges, buffers, and so on.

The storage controller 139 may comprise a write module 240 that is configured to store data on the storage medium 140 in response to requests received via the request module 231. The storage requests may comprise and/or reference the logical interface of the data pertaining to the requests. The write module 240 may be configured to store the data in a self-describing storage log, which, as disclosed above, may comprise appending data packets 110 sequentially within the storage address space 144 of the storage medium 140. The data packets 110 may comprise and/or reference the logical interface of the data (e.g., may comprise the LID(s) associated with the data). The write module 240 may comprise a write processing module 242 configured to process data for storage. Processing data for storage may comprise one or more of: a) compression processing, b) encryption processing, c) encapsulating data into respective data packets 110 (and/or other containers), d) performing error-correcting code (ECC) processing, and so on. The write buffer 244 may be configured to buffer data for storage on the storage medium 140. In some embodiments, the write buffer 244 may comprise one or more synchronization buffers configured to synchronize a clock domain of the storage controller 139 with a clock domain of the storage medium 140 (and/or interconnect 127).

The log storage module 136 may be configured to select storage location(s) for data storage operations and may provide addressing and/or control information to the storage arrays 115A-N of the independent banks 119A-N. As disclosed herein, the log storage module 136 may be configured to append data sequentially in a log format within the storage address space 144 of the storage medium 140. The log storage module 136 may be further configured to store data in a contextual format and/or with persistent metadata that defines the logical interface of the data (e.g., identifies the LIDs assigned to the data).

Storage operations to write data to the storage medium 140 may comprise: a) appending one or more data packets 110 to the storage log on the storage medium 140, and b) updating storage metadata 135 to associate LID(s) of the data with the storage addresses of the one or more data packets. In some embodiments, the storage metadata 135 may be maintained on memory resources of the storage controller 139 (e.g., on dedicated volatile memory resources of the storage device 141 comprising the storage medium 140). Alternatively, or in addition, portions of the storage metadata 135 may be maintained within the storage layer 130 (e.g., on a volatile memory resources 102 of the computing system 100 of FIG. 1A). In some embodiments, the storage metadata 135 may be maintained in a volatile memory by the storage layer 130, and may be periodically stored on the storage medium 140.

The storage controller 139 may further comprise a data read module 241 configured to read data from the storage log on the storage medium 140 in response to requests received via the storage request receiver module 231. The requests may comprise LID(s) of the requested data, a storage address of the requested data, and/or the like. The read module 241 may be configured to: a) determine the storage address(es) of the data packet(s) 110 comprising the requested data by use of, inter alia, the forward map 160, b) read the data packet(s) 110 from the determined storage address(es) on the storage medium 140, and c) process data for use by the requesting entity. Data read from the storage medium 140 may stream into the read module 241 via the read buffer 245. The read buffer 245 may comprise one or more read synchronization buffers for clock domain synchronization, as described above. The read processing module 243 may be configured to processes data read from the storage medium 140, which may include, but is not limited to, one or more of: a) decompression processing, b) decryption processing, c) extracting data from one or more data packet(s) 110 (and/or other containers), d) ECC processing, and so on.

The storage controller 139 may further comprise a bank controller 252 configured to selectively route data and/or commands of the write module 240 and/or read module 241 to/from particular independent banks 119A-N. In some embodiments, the storage controller 139 is configured to interleave storage operations between the independent banks 119A-N. The storage controller 139 may, for example, read from the storage array 115A of bank 119A into the read module 241, while data from the write module 240 is being programmed to the storage array 115B of bank 119B. Further embodiments of multi-bank storage operations are disclosed in U.S. patent application Ser. No. 11/952,095 entitled, "Apparatus, System, and Method for Managing Commands for Solid-State Storage Using Bank Interleave," filed Dec. 12, 2006 for David Flynn et al., which is hereby incorporated by reference.

The write processing module 242 may be configured to encode data packets 110 into ECC codewords. As used herein, an ECC codeword refers to data and corresponding error detection and/or correction information. The write processing module 242 may be configured to implement any suitable ECC algorithm and/or generate ECC codewords of any suitable type, which may include, but are not limited to, data segments and corresponding ECC syndromes, ECC symbols, ECC chunks, and/or other structured and/or unstructured ECC information. ECC codewords may comprise any suitable error-correcting encoding, including, but not limited to, block ECC encoding, convolutional ECC encoding, Low-Density Parity-Check (LDPC) encoding, Gallager encoding, Reed-Solomon encoding, Hamming codes, Multidimensional parity encoding, cyclic error-correcting codes, BCH codes, and/or the like. The write processing module 242 may be configured to generate ECC codewords of a pre-determined size. Accordingly, a single packet may be encoded into a plurality of different ECC codewords and/or a single ECC codeword may comprise portions of two or more data packets. Alternatively, the write processing module 242 may be configured to generate arbitrarily sized ECC codewords. Further embodiments of error-correcting code processing are disclosed in U.S. patent application Ser. No. 13/830,652 entitled, "Systems and Methods for Adaptive Error-Correction Coding," filed Mar. 14, 2013 for Jeremy Fillingim et al., which is hereby incorporated by reference.

As disclosed above, the storage layer 130 may be configured to maintain storage metadata 135 pertaining to storage operations performed on the storage medium 140. The storage metadata 135 may include a forward map 160 comprising associations between LIDs of the logical address space 132 and storage locations of the non-volatile storage device 141. The forward map 160 may be used to identify LIDs that correspond to valid data on the storage medium 140. The storage metadata 135 may be persistent and crash safe, such that the storage metadata 135 can be reconstructed from the contents of the storage medium 140. Storage clients 106 may leverage the large, thinly provisioned logical address space 132 of the storage layer 130 and/or persistent, crash-safe properties of the storage metadata 135 to improve the efficiency of certain storage operations.

In some embodiments, storage clients 106 may delegate certain metadata operations to the storage layer 130. Referring to system 300 of FIG. 3A, some storage clients 106 may maintain separate, storage client metadata (SCM) 309 pertaining to storage objects 308 of the storage client 106. The SCM 309 may be separate from and independent of the storage metadata 135 maintained by the storage layer 130. For example, SCM 309 maintained by a file system storage client 106 may include file allocation information to, inter alia, track the LIDs allocated to particular files, maintain the size of files, and so on. Similarly, a database storage client 106 may maintain SCM 309 to track the LIDs allocated to various database storage objects (e.g., objects, tables, elements, attributes, etc.), the size of the database storage objects, and the like. Such storage clients 106 may store the SCM 309 in persistent storage, such as the storage medium 140, to ensure that the SCM 309 is maintained in a persistent, crash-safe state. Accordingly, storage operations pertaining a storage object 308 of a storage client 106 may comprise: a) incrementally allocating logical resources for the storage object 308 (allocate additional LIDs within the logical address space 132), b) issuing one or more storage requests to the storage layer 130 to store data of the storage object 308 on the storage medium 140, and c) issuing one or more additional storage requests to store and/or update the SCM 309 of the storage client 106. The updates to the SCM 309 may indicate, inter alia, the new LIDs allocated for the storage object 308, update the size of the storage object 308, and so on.

The overhead of the additional storage operations performed by the storage clients 106 may be reduced by, inter alia, providing access to the persistent, crash-safe storage metadata 135 maintained by the storage layer 130. Storage clients 106 may leverage the storage metadata 135 maintained by the storage layer 130 to defer (and/or obviate) the need for frequently storing updates to the SCM 309 of the storage client 106. In addition, the storage layer 130 may be configured to reserve logical resources for storage objects 308, such that incremental LID allocations do not need to be performed each time a storage object 308 is extended.

As disclosed herein, the storage layer 130 may be configured to maintain a large, thinly provisioned logical address space 132 (e.g., a logical address space 132 that is larger than the underlying storage address space 144 of the storage medium 140). Use of a large, thinly provisioned logical address space 132 may simplify logical allocation operations and/or allow storage clients 106 to operate within large, contiguous LID ranges, with low probability of LID collisions. The storage layer 130 may leverage the logical address space 132 to over-provision logical capacity for storage objects 308 of the storage client 106. As used herein, "over-provisioning" refers to reserving more logical capacity than a capacity and/or size requirement of the storage object. A "capacity requirement" and/or "size requirement" can refer to one or more of: the storage capacity requested for the storage object 308 by, inter alia, a storage client 106, a current physical storage size of the storage object 308 (e.g., a buffer size of a file), a projected physical storage size of the storage object 308, and/or the like. Over-provisioning a file storage object 308 may comprise reserving more logical capacity (e.g., more LIDs) than a current size of file (or requested file size). For example, in response to a request to open and/or create a zero-length storage object 308 (e.g., a zero-length file), the storage layer 130 may reserve a range of LIDs for the storage object 308. Storage operations may be performed within the reserved, over-provisioned LID range without the need for incremental allocation and/or reservation operations. Moreover, the storage client 106 may leverage the persistent, crash-safe storage metadata 135 maintained by the storage layer 130 and pertaining to the storage object 308, such as the LIDs bound to data of the storage object 308, the size of the storage object 308, and so on. Accordingly, the storage client 106 may reduce the size and/or complexity of the SCM 309 maintained for the storage object 308 and/or may eliminate the need to store the SCM 309 on persistent storage (or reduce the frequency of updates to the persistent metadata).

Figure 3A:
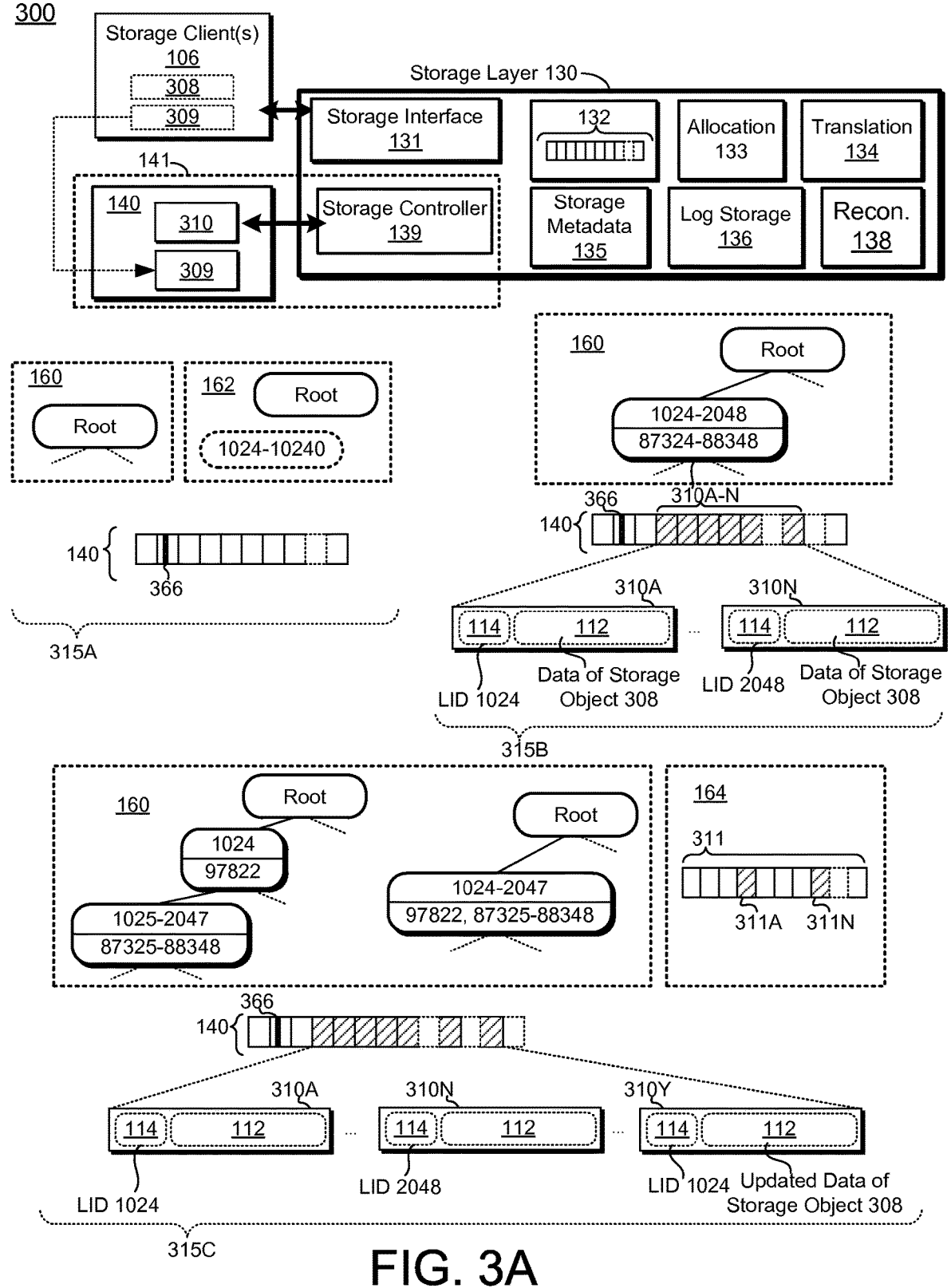
FIG. 3A is a block diagram of one embodiment of a system comprising a storage layer configured to manage storage metadata.

FIG. 3A further illustrates operations implemented by the storage layer 130 to improve the efficiency of storage operations performed by the storage client 106. In state 315A, the storage layer 130 over-provisions logical resources for a storage object 308 of the storage client 106. In the FIG. 3A embodiment, the storage layer 130 provisions LIDs 1024-10240 for the storage object 308 in response to a request to create and/or open a new, empty storage object 308. Reserving the LIDs for use by the storage object 308 may comprise updating storage metadata 135 of the storage layer to indicate that the LIDs 1024-10240 are reserved for use by, inter alia, updating the reservation data structure 162. As illustrated in state 315A, an entry in the reservation data structure 162 may indicate that the LIDs 1024-10240 have been provisioned for use by a particular storage object 308. The reservation data structure 162 may be configured to associate the reserved LIDs 1024-10240 with the storage object 308. The storage object 308 may be identified by use of one or more of an object identifier, a name, a file name, and/or the like. As indicated by the forward map 160, the LIDs 1024-10240 are not currently in use to reference data of the storage object 308 (e.g., are not bound to storage locations of the storage medium 140). Accordingly, the entry for 1024-10240 may represent a reservation of logical resources that do not correspond to valid data stored on the non-volatile storage device 141. Accordingly, the LID reservation may not affect the amount of free physical storage resources available on the storage medium 140 for use by other storage clients 106 and/or other storage objects 308. Reserving the LIDs 1024-10240 may further comprise storing metadata 366 on the storage medium 140. The metadata 366 may indicate that the specified LIDs have been reserved for use by the storage object 308. The metadata 366 may be used to reconstruct the LID allocation from the contents of the storage medium 140 after loss of the storage metadata 135 stored in volatile memory resources 102 of the computing system 100.

State 315B depicts the result of storage operation(s) configured to append data to the storage object 308. The storage operation(s) of state 315B may correspond to one or more storage requests to append data to a zero-length file, expand the file, and/or the like. The storage operation(s) may comprise storing data of the storage object 308 on the storage medium 140. The data may be stored in one or more data packets 310A-N. As disclosed herein, the data packets 310A-N may comprise a persistent metadata 114 configured to bind data of the storage object 308 (data segment 112) to a respective LID 1024-2048. As illustrated in FIG. 3A, the persistent metadata 114 of data packet 310A binds a data segment 112 of the storage object 308 to LID 1024 and the persistent metadata 114 of data packet 310N (the last data packet in the sequence) binds a data segment 112 to LID 2048. The storage operation(s) may further comprise updating the forward map 160 to associate the LIDs 1024-2048 with the storage locations 87324-88348 comprising the data packets 310A-N.

Although FIG. 3A depicts data packets 310A-N stored contiguously within the storage address space 144 the disclosure is not limited in this regard. The data packets 310A-N could be stored at any arbitrary storage locations on the storage medium 140, and could be interleaved with data of other storage clients 106 and/or data of other storage objects 308.

As disclosed herein, the storage layer 130 may be configured to update, modify, and/or overwrite data out-of-place on the storage medium 140. Accordingly, and as illustrated in state 315C, a subsequent storage operation pertaining to LID 1024 may result in storing a data packet 310Y at another storage address 97822 of the storage medium 140 (e.g., according to the current append point 180). The packet 310A comprising the obsolete version of the data corresponding to LID 1024 may remain on the storage medium 140. As disclosed above, the data packet 310A may be marked as invalid in the storage metadata 135. Marking the data packet 310A invalid may comprise removing the association between the storage location comprising the data packet 310A (storage location 87324) and the LID 1024. As illustrated in state 315C, the storage layer 130 has updated the forward map 160 to bind LID 1024 to the new storage address 97822. State 315C illustrates two alternative embodiments for updating the forward map 160. In one embodiment, updating the forward map 160 comprises one or more of a) creating a new, separate entry representing the binding between LID 1024 and storage address 97822, or b) modifying the existing entry corresponding to the modified LID 1024 to reference the disjoint storage identifier 97822.

The storage metadata 135 may further comprise a reverse map 164. The reverse map 164 may comprise entries 311 configured to indicate the status of the storage locations within the storage address space 144 of the storage medium 140. The entries 311 may be indexed and/or arranged according to the storage addresses of the storage address space 144, as opposed to the LIDs of the logical address space 132 (as in the forward map 160). In some embodiments, the forward map 160 and reverse map 164 may be implemented as a shared data structure capable of being indexed by either LID or storage address. In the FIG. 3A embodiment, the entries 311 of the reverse map 164 indicate whether a particular storage location comprises valid data. Accordingly, the entries 311 may correspond to bits within a validity bitmap. In state 315C, the entry 311A of the validity bitmap may be updated to indicate that the storage location 87324 of data packet 310A comprises invalid data that does not need to be retained. The storage layer 130 may use the validity information of the reverse map 164 (and/or forward map 160) to reclaim storage resources, as disclosed herein.

The storage layer 130 may be configured to provide for invalidating data stored on the storage medium 140. Invalidating data may comprise, unmapping, discarding, removing, erasing, deleting, and/or TRIMing data from the storage medium 140. In some embodiments, the interface 131 is configured to receive invalidation messages (e.g., delete requests, erase commands, TRIM messages, persistent TRIM messages, unmap message, discard message, and/or the like). A TRIM message may indicate that one or more LIDs are no longer in use to reference data stored on the storage medium 140. In response to a TRIM message, the storage layer 130 may remove the TRIMed LIDs from the forward map 160. Removing the LIDs from the forward map 160 may modify the status of the LIDs. Since the LIDs no longer exist in the forward map 160, the storage layer 130 indicates that the LIDs are no longer in use to reference data stored on the storage medium 140, have no physical occupancy, do not contribute to the size of the storage object 308, and so on. The data formerly bound to the LIDs may be removed from the non-volatile storage medium 140 in one or more storage reclamation operations (e.g., grooming/garbage collection operations), as disclosed above. The storage layer 130 may be configured to indicate that the LIDs are unbound and/or unassigned in response to removing the LIDs from the forward map 160 and/or before the data formerly bound to the LIDs is removed from the non-volatile storage medium 140. The storage layer 130 may be further configured to mark the storage locations comprising data of the identified LIDs as invalid in the reverse map 164, as disclosed herein.

The storage operation(s) of state 315C may further include a storage operation to TRIM data corresponding to LID 2048 (e.g., a TRIM message). In response, the storage layer 130 may update the storage metadata 135 to mark the data corresponding to LID 2048 as invalid, which may comprise removing the LID 2048 from the forward map 160 and/or marking the storage address of the data packet 310N invalid in the reverse map 164, as disclosed herein.

The TRIM operation may be signified in data structures maintained in the volatile memory resources 102 of the computing system 100. Accordingly, until the forward map 160 (and/or other metadata) is persisted, the TRIM operation may be subject to loss due to failure conditions. As disclosed herein, in a failure condition, the reconstruction module 138 may be configured to reconstruct the storage metadata 135 from the contents of the storage medium 140, which may comprise accessing the data packets 310Y and 310N-A (from newer to older in the storage log). The reconstruction module 138 may include LID 2048 in the forward map in response to accessing data packet 310N. As such, after reconstructing the forward index 160, the storage layer 130 may indicate that the LID 2048 is bound and/or assigned to the data packet 310N, obviating the effect of the TRIM operation performed in state 315C. Undoing the TRIM operation may create problems for storage clients 106 that expect the data at 2048 to have been invalidated. Accordingly, in some embodiments, the storage layer 130 may be configured to perform invalidation operations, such as TRIM, by use of persistent, crash-safe metadata.

Figure 3B:
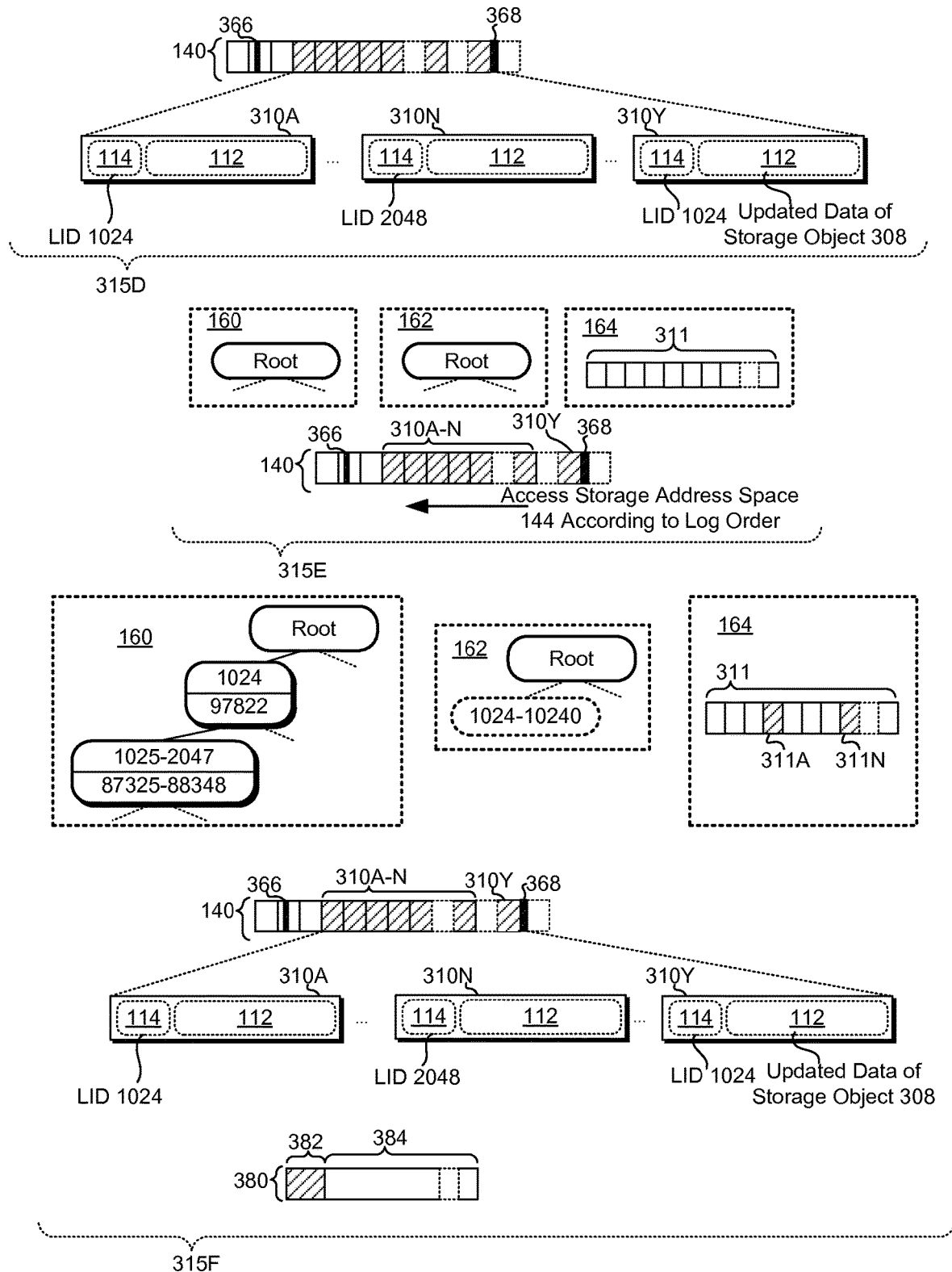
FIG. 3B depicts embodiments recovery operations for persistent storage metadata.

Referring to state 315D of FIG. 3B, in some embodiments, the storage layer 130 may be configured to store metadata 368 on the storage medium 140, in response to the TRIM message of state 315C. The metadata 368 may be configured to indicate that data of packet 310N corresponding to LID 2048 is invalid. The metadata 368 may comprise a persistent TRIM note. Further embodiments for persistent TRIM notes are disclosed in U.S. patent application Ser. No. 13/330,554 entitled, "Apparatus, System, and Method for Persistent Data Management on a Non-Volatile Storage Media," filed on Dec. 19, 2011 for David Flynn et al., which is hereby incorporated by reference. The storage layer 130 may be configured to store metadata 368 in response to all requests that invalidate data stored on the storage device 141. Alternatively, the storage layer 130 may be configured to store the metadata 368 in response to particular types of invalidation requests (e.g., explicit persistent TRIM requests), request parameters, and/or the like.

State 315E, illustrates the loss of the volatile memory resources 102 of the computing device 100, resulting in the loss and/or corruption of the forward map 160, reservation data structure 162, and/or reverse map 164. The reconstruction module 138 may be configured to reconstruct the storage metadata 135 by use of the contents of the storage medium 140. The reconstruction module 138 may be configured to traverse the storage address space 144 of the storage medium 140 according to a log order of storage operations performed on the storage medium 140. As disclosed above, the reconstruction module 138 may determine the log order of storage operations based on: a) the log order of storage divisions as determined by, inter alia, respective sequence information 113, and b) the storage addresses of the data within the storage divisions. As illustrated in FIG. 3B, the reconstruction module 138 may be configured to access the storage log in a reverse log order (e.g., from most recent to older). Alternatively, in other embodiments, the reconstruction module 138 may be configured to access the storage log from older to more recent. Accessing the data in reverse log order may comprise accessing: a) the metadata 368 corresponding to the TRIM message, b) packet 310Y, c) packets 310N-A, and d) metadata 366 corresponding to the allocation of LIDs 1024-10240 to the storage object 308.

As illustrated in state 315F, the reconstruction module 138 may update the reverse map 164 to indicate that the storage location 311N corresponding to LID 2048 is invalid (e.g., has been TRIMed) in response to the metadata 368 (e.g., the persistent TRIM note). The reconstruction module 138 may be further configured to reconstruct the forward map entry corresponding to LID 1024 in response to accessing data packet 310Y at storage address 97822. Entries corresponding to LIDs 1025-2047 may be reconstructed in response to accessing the data packets 310B-N at storage locations 87325-88348. The packet 310N may be identified as invalid based on the persistent TRIM metadata 368, as disclosed above. The reconstruction module 138 may determine that the data packet 310A comprises invalid, obsolete data in response to determining that the data packet 310A corresponds to LID 1024 that is already in the forward map 160 (e.g., was overwritten in a storage operation that is more recent in the storage log). In response, the reconstruction module 138 may update the entry 311A of the reverse map 164 to indicate that the data stored at 87324 is invalid and/or does not need to be retained. The reconstruction module 138 may reconstruct the allocation of LIDs 1024-10240 to the storage object 308 in response to the metadata 366.

As illustrated above, the reconstruction module 138 may be capable of reconstructing the storage metadata 135 maintained by the storage layer 130 based on the contents of the storage medium 140 (e.g., by use of the contextual, log storage format of the data). The interface 131 may be configured to provide access to the storage metadata 135, which may enable storage clients 106 to delegate metadata management operations to the storage layer 130. Accordingly, storage operations that required additional storage operations to synchronize the SCM 309 of the storage client 106 may be streamlined to rely on the persistent, crash-safe storage metadata 135 managed by the storage layer 130. Referring back to FIG. 3A, as disclosed above, a storage operation pertaining to a storage object 308 may be simplified to include only appending data of the storage object 308 to the storage medium 140 (in a contextual data format) as opposed to: a) incrementally reserving logical storage resources for the operation, b) performing the storage operation(s) pertaining to the storage object 308, and c) performing additional overhead storage operation(s) to persist updates to the SCM 309.

In some embodiments, the SCM 309 maintained by the storage client 106 may be configured to indicate LID information, such as a) the LIDs reserved for use by the storage object 308, b) the status of the LIDs reserved for use by the storage object 308 (e.g., identify LIDs that exist within the forward map 160), and/or c) the size, length, and/or extent of data of the storage object 308 on the storage medium 140. The storage layer 130 may be configured to provide this information through, inter alia, the interface 131, obviating the need to the storage client 106 to track this information. Moreover, since the storage metadata 135 maintained by the storage layer 130 is persistent and crash-safe, the storage client 106 may defer (and/or eliminate) frequent updates the SCM 309 stored on persistent storage. Accordingly, storage operations pertaining to the storage object 308 may comprise writing data to the storage log on the storage medium 140, and may defer and/or omit separate allocation and/or metadata update operations.

As disclosed above, the storage layer 130 may be configured to provide LID status information to storage clients 106 through, inter alia, the interface 131. The LID status information may include, but is not limited to: a) whether the LID exists in the forward map 160, b) whether the LID is currently in use to reference data stored on the non-volatile storage device 141, c) the physical storage resources occupied by the LID, d) the physical storage size corresponding to the LID, and so on. The LID status information may be determined by use of the forward map 160 reconstructed in state 315E, as disclosed herein.

In state 315E of FIG. 3B, the status information of LIDs 1024-10240 may indicate that the LIDs 1024-2047 exist in the forward map 160 and, as such, are currently in use to reference data stored on the non-volatile storage device 141. The status of LIDs 2048-10240 may further indicate that the LIDs 2048-10240 do not exist in the forward map 160 and are not currently in use to reference valid data on the non-volatile storage device 141.

The storage layer 130 may be further configured to provide status information pertaining to storage objects 308. The status information pertaining to a storage object 308 may correspond to the status information of the LIDs provisioned to the storage object 308 (e.g., the collection of LIDs reserved for use by the storage object 308). The status information pertaining to a storage object 308 may include, but is not limited to: a) the number of LIDs designated for the storage object 308 that exist in the forward map 160, b) an identified subset of the designated LIDs that are currently in use to reference data stored on the storage medium 140, c) the physical occupancy corresponding to the designated LIDs, d) physical storage resource usage represented by the designated LIDs, e) the size of the data of the storage object 308 stored on the storage medium 140 (e.g., the actual physical size of the storage object 308 on the non-volatile storage device 141), and so on.

In the FIG. 3B embodiment, LIDs 1024-10240 are reserved for use by the storage object 308. Accordingly, the status information pertaining to the storage object 308 may be based on, inter alia, the status of the LIDs 1024-10240. The storage layer 130 may determine the status information by use of the forward map 160. In state 315E, LIDs 1024-2047 of the LIDs designated for use by the storage object 308 exist in the forward map 160. Accordingly, the storage layer 130 may identify the subset of the LIDs reserved for use by the storage object 308 that are currently in use to reference data stored on the storage medium 140 as comprising LIDs 1024-2047. Based on this information, the storage layer 130 may provide status information pertaining to the storage object 308, such as the physical occupancy of the storage object 308, the size of the storage object 308, and so on. The physical occupancy of the storage object 308 on the storage device 141 may correspond to the physical occupancy of the LID range 1024-10240, which, as disclosed above, comprises 1023 LIDs (e.g., LIDs 1024-2047 are currently physically occupying storage locations of the storage device 141). Accordingly, the storage layer 130 may indicate that the physical occupancy of the storage object 308 is 1023 times the storage granularity associated with the LIDs (e.g., 1023 times the size of a storage location, data block, sector, data segment 112, and/or the like). Similarly, the storage layer 130 may indicate that the physical storage size of the storage object 308 corresponds to 1023 LIDs. The physical occupancy and/or storage size of the storage object 308 may, therefore, differ from the logical capacity reserved to the storage object 308, which, as disclosed above, includes the larger LID range 1024-10240. The storage layer 130 may be further configured to indicate that LIDs 2048-10240 are reserved for use by the storage object 308, but are not current in use to reference data stored on the storage medium 140.

In some embodiments, the storage layer 130 may indicate the status of the storage object 308 by use of a physical occupancy data structure 380. The physical occupancy data structure 380 may comprise a bitmap, compressed bitmap, a range-encoded data structure, a map, an index, and/or the like. The data structure 380 may be configured to identify LID(s) and/or LID ranges that are currently occupying physical storage resources (e.g., LIDs that are bound and/or assigned to physical storage resources) as well as LIDs and/or LID ranges that are not currently occupying physical storage resources (e.g., LIDs that are unbound and/or unassigned to physical storage resources). In the FIG. 3B embodiment, the data structure 308 may comprise physical occupancy indications corresponding to the LIDs 1024-10240 provisioned to the storage object 308. As illustrated in FIG. 3B, the physical occupancy data structure 380 may comprise a region 382 configured to indicate that LIDs 1024-2047 are currently bound and/or assigned to data stored on the non-volatile storage device 141 (e.g., currently occupy physical storage resources). The physical occupancy data structure 380 may further comprise a region 384 configured to indicate that the LIDs 2048-10240 are currently unbound and/or unassigned to storage addresses and, as such, do not occupy physical storage resources of the storage medium 140. Although not depicted in FIG. 3B, the physical occupancy data structure 380 may further comprise an indication of the physical occupancy corresponding to the storage object 308 and/or a size of the storage object 308 (e.g., physical storage size of the storage object 308, as disclosed above). The storage layer 130 may be configured to provide the data structure 308 to a storage client 106. The data structure 308 may be generated for the storage client 106 in response to a request, in response to loss of volatile memory resources (e.g., a crash), and/or the like.

Figure 4A:
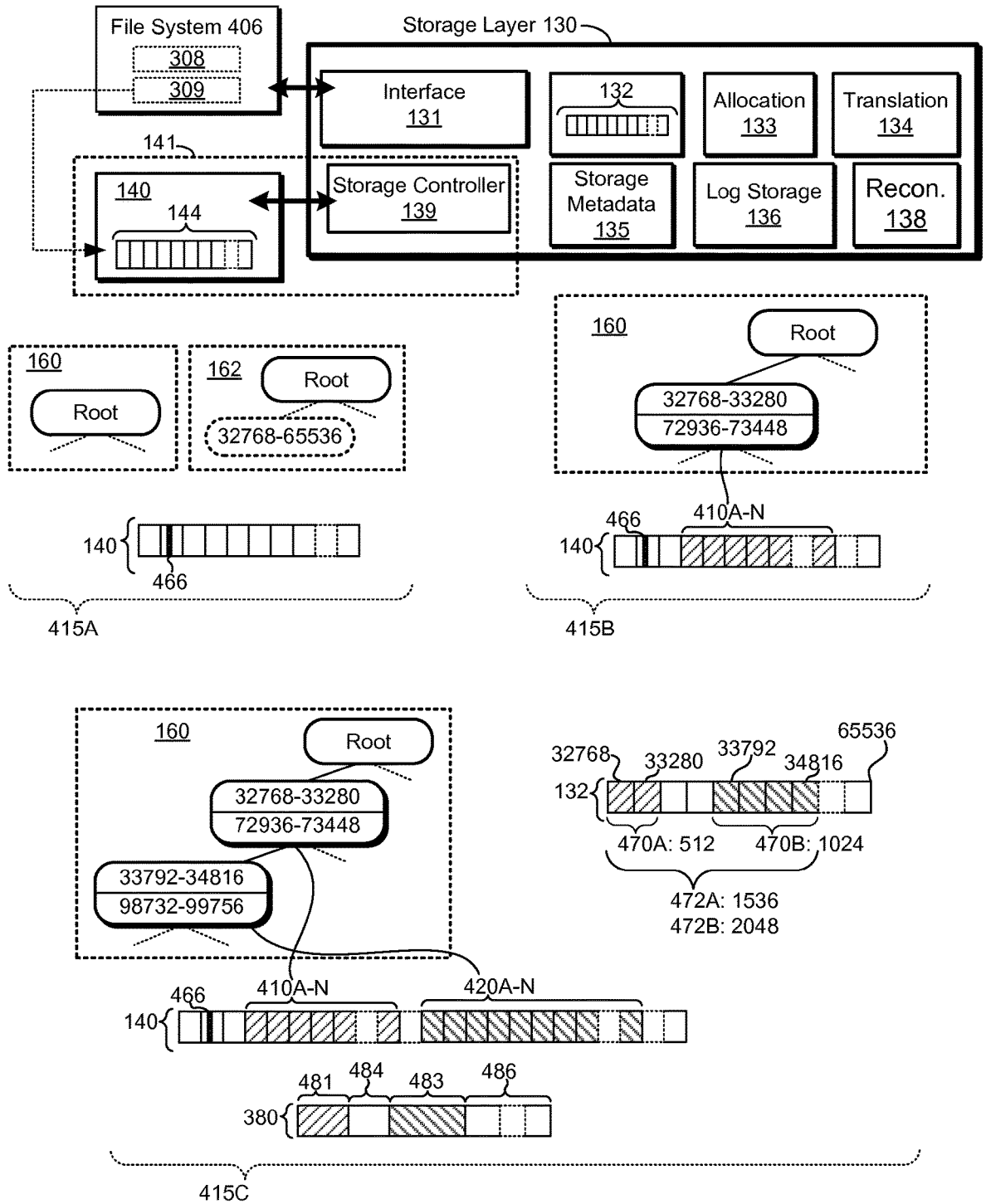
FIG. 4A is a block diagram of another embodiment of a system comprising a storage layer configured to manage storage metadata.

FIG. 4A is a block diagram of a system 400 comprising another embodiment of a storage layer 130 configured to manage persistent storage operations for a file system storage client 406. As disclosed above, the storage layer 130 may comprise an interface 131 configured to access the storage services provided by the storage layer 130. In some embodiments, the interface module 131 may be further configured to provide access to information pertaining to the storage metadata 135 managed by the storage layer 130. The file system storage client 406 may, therefore, use the interface 131 to delegate metadata management operations to the storage layer 130, as disclosed herein. The interface 131 may include, but is not limited to: interfaces for creating and/or opening storage objects 308 (e.g., files), interfaces for identifying the LIDs reserved for use by storage objects 308, interfaces for identifying the LIDs that are in use to reference data on the storage medium 140, interfaces for determining the size of storage objects 308 on the storage medium 140, and so on.

As disclosed herein, the storage layer 130 may comprise a thinly provisioned logical address space 132 having a logical capacity that exceeds a physical storage capacity of the non-volatile storage device 141. The storage layer 130 may leverage the thinly provisioned logical address space 132 to efficiently manage metadata for the file system storage client 406. As disclosed above, the allocation module 133 may be configured to reserve large, sparse LID ranges for storage objects 308. The allocation module 133 may reserve more LIDs than requested by the file system 406 and/or more logical capacity than needed by the storage object 308. Due to the large size of the logical address space 132, the pre-allocation may not impact the availability of LIDs for other storage objects 308. Moreover, since physical storage resources are not bound to the LIDs until the LIDs are in use to reference valid data stored on the storage medium 140, the pre-allocation of logical capacity may not impact the availability of physical storage resources for other storage objects 308.

In some embodiments, the allocation module 133 may be further configured to reserve blocks of LIDs of a predetermined size and/or extent. The allocation module 133 may, for example, be configured to virtually "segment" the LIDs of the logical address space 132 into two separate portions, including a first identifier portion and a second offset portion. The identifier portions of the LIDs may correspond to the high-order bits (e.g., upper 32 bits of 64-bit LIDs), and the offset portion may correspond to low-order bits (e.g., lower 32 bits of 64-bit LIDs). The allocation module 133 may be configured to evenly partition 64-bit LIDs, resulting in 2^32 unique LID ranges, each of which may comprise a contiguous range of 2^32 LIDs. The disclosure is not limited in this regard, however, and could be adapted to use any suitable LID segmentation and/or allocation scheme. For instance, in embodiments that require a large number of relatively small storage objects, the allocation module 133 may segment the LIDs asymmetrically to use a larger proportion of the LIDs for identifier bits, and a smaller proportion for offset bits (e.g., 42 identifier bits and 22 offset bits). Alternatively, where larger objects are used, the allocation module 133 may segment the LIDs to utilize fewer identifier bits and more offset bits (e.g., 16 identifier bits and 48 offset bits). Furthermore, the storage layer 130 may present a larger logical address space 132 comprising 128-bit LIDs, in accordance with the requirements of the storage clients 106, configuration of the computing system 100, and/or configuration of the non-volatile storage device 141. The storage layer 130 may use the LID segmentation scheme of the allocation module 133 to simplify the storage metadata 135. The entries of the forward map 160 may, for example, be indexed using only the identifier portion of the LID, which may reduce the memory and/or storage overhead of the forward map 160.

Figure 4B:
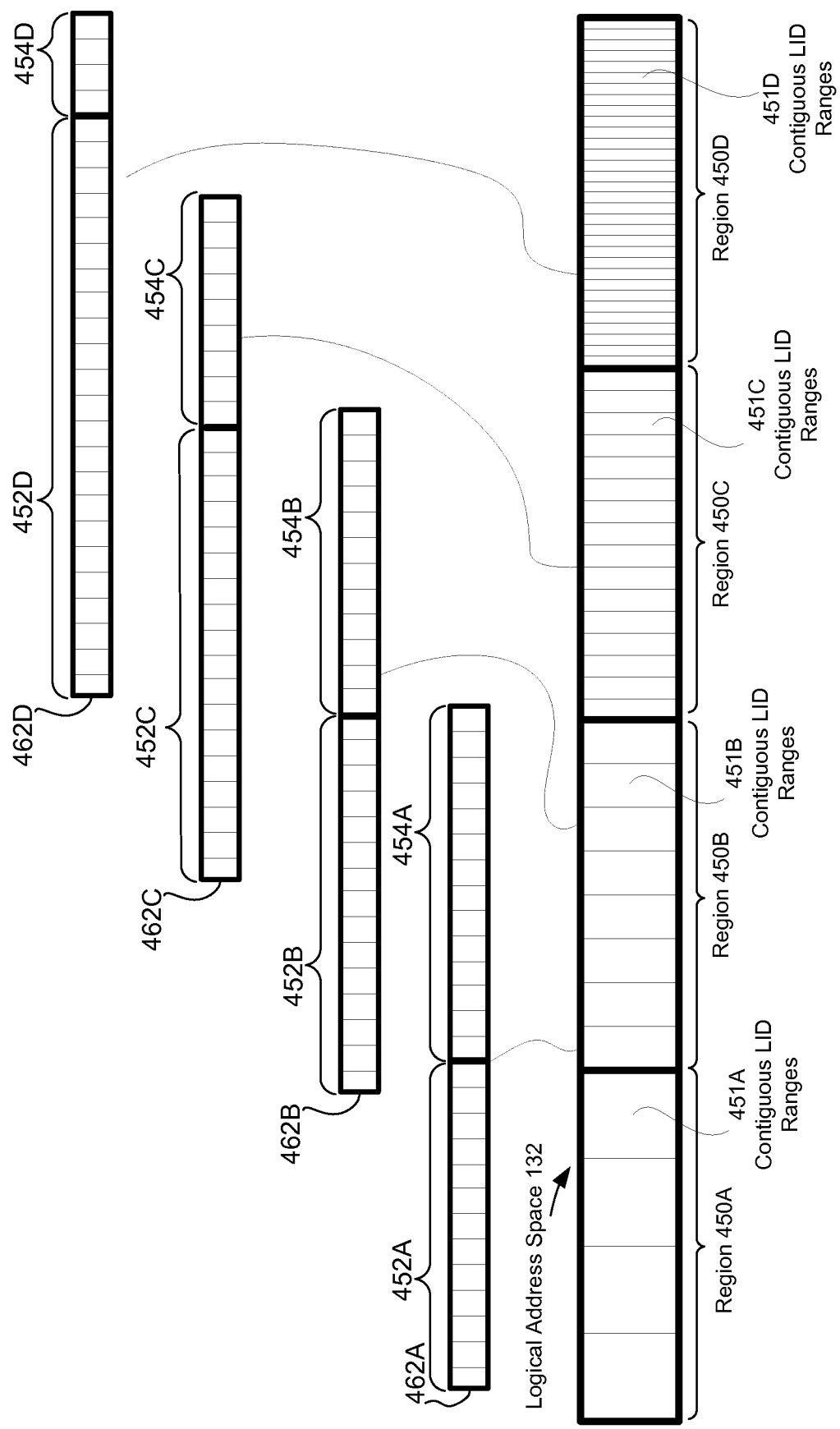
FIG. 4B depicts embodiments of reservation regions of a logical address space.

Referring to FIG. 4B, the allocation module 133 may be further configured to divide the logical address space 132 into a plurality of different reservation regions 450A-D, such that each reservation region corresponds to a different respective LID segmentation scheme 462A-D. In the FIG. 4B embodiment, the allocation module 133 is configured to partition the logical address space 132 into four reservation regions: 450A, 450B, 450C, and 450D. Allocation operations within the reservation regions 450A-D may correspond to a different respective logical allocation granularity; logical allocation operations within the regions 450A-D correspond to differently sized LID collections, ranges, and/or extents. The reservation region 450A may comprise relatively large contiguous LID ranges 451A, such that allocation operations therein result in reserving a large extent of contiguous LIDs. The region 450A may, therefore, be suited for large storage objects 308. By contrast, the region 450D may correspond to relatively small contiguous LID ranges 451D, such that allocation operations correspond to smaller LIDs collections (e.g., 2^12 LIDs). As such, the region 450D may be suited for use with smaller storage objects 308. The other regions 450B and 450C may correspond to respective allocation ranges 451B and 451C, each having a different respective LID allocation granularity.

Although FIG. 4B depicts regions 450A-D as being of approximately the same size, the disclosure is not limited in this regard. In some embodiments, the allocation module 133 may be configured to partition the logical address space 132 into differently sized regions 450A-D and/or into different numbers of regions 450A-D. The reservation regions 450A-D may comprise and/or result in a different virtual segmentation of the LIDs 462A-D of the logical address space 132. As illustrated in FIG. 4B, the segmentation of LIDs 462A within reservation region 450A may include a larger proportion of offset bits 454A than the segmentation of LIDs 462D within reservation region 450D. Conversely, the segmentation scheme for the LIDs 462D of region 450D may comprise a larger number of identifier bits 452D than the segmentation scheme for LIDs 462A of reservation region 450A.

In some embodiments, the storage layer 130 may provide access to allocation information through the interface 131. The interface 131 may be configured to publish information pertaining to the reservation regions 452A-D used by the allocation module 133, indicate the remaining, unreserved and/or unbound resources within a particular reservation region 452A-D, and the like. The interface 131 may be further configured to provide for specifying a desired allocation granularity for a particular storage object 308. An allocation request may, for example, request allocation within a particular reservation region 450A-D.

In some embodiments, the allocation module 133 may be further configured to automatically select a suitable reservation region 450A-D based on one or more reservation policies, which may include, but are not limited to: availability of contiguous LID ranges within the reservation regions 450A-D, whether the LID range is expected to grow, information pertaining to the storage client 106 associated with the storage object 308, information pertaining to an application associated with the storage object 308, information pertaining to a user of the storage object 308, request parameters (e.g., ioctrl, fadvise, etc.), and/or the like. Further embodiments of systems and methods for managing storage allocation are disclosed in U.S. patent application Ser. No. 13/865,153 entitled "Systems and Methods for Storage Allocation," filed Apr. 17, 2013 for David Flynn et al., which is incorporated by reference herein.

The storage layer 130 may be further configured to relocate storage objects 308 to/from different reservation regions 450A-D of the logical address space 132. Storage objects 308 may be relocated in response to storage requirements of the storage object 308, storage requirements of other storage objects 308, storage requirements of other storage clients 106, conditions on the storage medium 140, a relocation request, and/or the like. In one embodiment, a storage object 308 may initially be provisioned LIDs within the reservation region 450D. The storage object 308, however, may grow to require more than a single contiguous LID range 451D. In response, the allocation module 133 may provision additional contiguous LID ranges 451D for the storage object 308 within the region 450D. Alternatively, the storage layer 130 may determine that the storage object 308 should be relocated to another, larger reservation region 450B-C. Relocating the storage object 308 may comprise one or more range move operations, as disclosed in U.S. Provisional Patent Application No. 61/858,812 entitled, "Systems and Methods for Storage Consistency," filed on Jul. 26, 2013, for Nisha Talagala et al., which is hereby incorporated by reference.

Referring back to FIG. 4A, file storage operations typically involve additional management operations. In some cases, each storage operation to append and/or write data to a storage object 308 includes: a) incrementally allocating logical capacity for the storage object 308, b) writing data of the storage object to the storage medium 140, and c) writing SCM 309 pertaining to the modification(s) to the storage object 308 to a non-volatile storage (e.g., the storage medium 140, or another storage resource). Writing the SCM 309 of the file system storage client 406 may comprise storing persistent, crash-safe file allocation information that identifies the LIDs reserved for use by particular files, determines file sizes, and so on. As disclosed above, the interface 131 may be configured to provide access to the persistent, crash-safe storage metadata 135 maintained by the storage layer 130. The file system storage client 406 may leverage the persistent, crash-safe metadata 135 of the storage layer 130 to, inter alia, reduce the complexity of (and/or eliminate) SCM 309 maintained by the file system 309 and/or reduce the frequency of storage operations to persist updates to the SCM 309.

The allocation module 133 may be configured to reserve excess logical capacity for storage objects 308 of the file system 406. In some embodiments, logical capacity may be reserved within one or more reservation regions 450A-D of the logical address space 132, as disclosed herein. Reserving logical capacity for the storage object of the file system 406 may obviate the need for the file system 406 to incrementally allocate logical capacity as storage objects 308 are expanded.

As disclosed above, the storage layer 130 may provide access to the information pertaining to the storage objects 308 through, inter alia, the interface 131. The storage layer 130 may determine the information pertaining to the storage objects 308 by use of the storage metadata 135. As disclosed above, the storage metadata 135 may be persistent and crash safe. The storage layer 130 may comprise a reconstruction module 138 configured to reconstruct the storage metadata 135, including the forward map 160, reservation data structure 162, and/or reverse map 164 from the contents of the storage medium 140. The file system 406 may, therefore, delegate the management of metadata pertaining to the storage objects 308 to the storage layer 130, which may reduce the overhead of metadata management operations performed by the file system 406. Accordingly, operations to append data to a storage object 308 may comprise writing data of the storage object to the storage medium 140 in a contextual format, configured to bind the data of the storage object 308 to the LIDs assigned to the storage object by the allocation module 133. The additional overhead operations for incrementally allocating logical resources for the storage object and/or storing updates to the file system SCM 309 to indicate the LIDs used by the file and/or the size of the file may be deferred and/or omitted. Alternatively, or in addition, the file system 406 may maintain such SCM 309 in the volatile memory resources 102 of the computing system 100, and may not persist updates to such SCM 309 each time a storage object 308 is modified.

State 415A of FIG. 4A illustrates one embodiment of a storage operation to open and/or create a storage object 308 for the file system 406 by use of the storage layer 130. The storage object 308 may be created in response to a request from the file system 406 (e.g., a file open request). The request may comprise a request to create and/or open one or more of: an empty file, a zero-length file, a file having a predetermined size and/or extent, and/or the like. The storage layer 130 may be configured to over-provision logical resources for the storage object 308, in response to the request. As disclosed herein, over-provisioning logical resources may comprise reserving more logical capacity than a capacity requirement of the storage object 308 (e.g., more capacity than requested for the storage object 308, more capacity than currently needed for the storage object 308, and/or the like). Over-provisioning may, therefore, comprise designating a large collection of LIDs for use by the storage object 308. The LIDs may comprise a contiguous LID range within a particular reservation region 450A-D, as disclosed herein. In the FIG. 4A embodiment, the allocation module 133 may reserve a 32 k range of LIDs for the storage object 308 (e.g., a LID range 32768-65536). Reserving the logical capacity for the storage object 308 may further comprise updating the storage metadata 135 to indicate that the LIDs are reserved for the storage object 308 (e.g., in an reservation data structure 162). In some embodiments, the allocation table 162 is configured to associate the LIDs allocated for use by the storage object with an identifier of the storage object 308, such as an object identifier, name, file name, file identifier, and/or the like. The allocation may be made persistent and crash-safe by appending reservation metadata 466 to the storage log on the storage medium 140. As disclosed above, the reconstruction module 138 may use the reservation metadata 466 to reconstruct the reservation data structure 162 in the event of loss and/or corruption of the storage metadata 135, which may comprise associating the LIDs 32768-65536 reserved for the storage object 308 with an identifier of the storage object 308, as disclosed herein.

In state 415B, the file system 406 may append data to the storage object 308 (e.g., in one or more write storage requests) in association with LIDs within the large LID range reserved for the storage object 308. Appending data of the storage object 308 may comprise appending data packets 410A-N at an append point 180 within the storage address space 144 of the storage medium 140. The data packets 410A-N may comprise persistent metadata 114 configured to bind respective data segments 112 of the data packets 410A-N to respective LIDs (e.g., LIDs 32768-33280), as disclosed herein. The storage operation(s) may further comprise updating the forward map 160 to bind the LIDs 32768-33280 to the storage addresses of the data packets 410A-N. The forward map 160 may be maintained in volatile memory resources 102 of the computing system 100. The modifications to the storage object 308, and specifically the changes to the forward map 160, may be persistent and crash-safe due to, inter alia, the contextual, log-based storage format of the data packets 410A-N appended to the storage medium 140. As disclosed herein, the reconstruction module 138 may be configured to rebuild the bindings between the LIDs 32768-33280 and the storage addresses of the data packets 410A-N (and corresponding entries in the forward map 160) by use of the persistent metadata 114 stored with the data packets 410A-N. The reconstruction module 138 may be further configured to distinguish valid data from data that is invalid, obsolete, erased, and/or TRIMed, based on the log order of storage operations performed on the storage medium 140 (e.g., sequence identifiers 113 on storage divisions, and the storage addresses of data within the storage divisions). Accordingly, modifications to the storage object 308 implemented by the storage layer 130 may be persistent and crash safe without the need for storing updates to the SCM 309 of the file system 406. Moreover, the storage operations may be implemented within the reserved LID range of the storage object 308, and as such, the storage operation may not require the additional steps of incrementally allocating logical capacity for the storage object 308 and/or storing corresponding persistent metadata pertaining to the storage object 308, such as, inter alia, the current size of the storage object 308.

As disclosed above, the storage layer 130 may be configured to provide information pertaining to the storage object 308 through the interface 131. The information may include, but is not limited to: information pertaining to the size, range, and extent of the LIDs reserved for use by the storage object 308; LID physical usage information (e.g., identify which LIDs are currently in use to reference data stored on the non-volatile storage device 141); the size of the storage object 308 on the non-volatile storage device 141; and/or the like. The storage layer 130 may determine the information pertaining to the storage object 308 by use of the persistent, crash-safe storage metadata 135 maintained by the storage layer 130, such as the forward map 160. The storage layer 130 may implement an "exists" interface by use of the forward map 160. As used herein, an "exists" interface refers to an interface for determining the physical assignment status of a LID, such as whether the LID is currently associated with data stored on the non-volatile storage device 141, whether the LID currently occupies physical storage capacity of the non-volatile storage device 141, whether the LID is assigned to a storage address, and/or the like. As disclosed herein, the forward map 160 may comprise LIDs that are currently bound to storage addresses of the storage medium 140. Accordingly, LIDs that are included in the forward map 160 (e.g., LIDs that "exist" in the forward map 160) correspond to valid data stored on the storage medium 140. Accordingly, LIDs that exist in the forward map 160 are tied and/or bound to stored data (e.g., storage addresses) and, as such, currently occupy physical storage resources of the non-volatile storage device 141. Conversely, LIDs that do not exist within the forward map 160 do not correspond to valid data, even if those LIDs have been reserved for use by a particular storage object 308. LIDs that exist within the forward map 160 may, therefore, represent usage of physical storage resources, whereas LIDs that do not exist within the forward map 160 may not correspond to physical storage resource usage.

In state 415A, the storage layer 130 may determine that, although LIDs 32768-65536 have been reserved by the storage object 308, none of the specified LIDs exist in the forward map 160 (e.g., none of the reserved LIDs 32768-65536 are bound to data on the non-volatile storage device 141), and as such, the storage object 308 is empty. The storage layer 130 may be further configured to indicate the status of the LIDs 32768-65536 as being provisioned for use by the storage object 308, but not assigned and/or bound to data on the storage medium 140.

In state 415B, the storage layer 130 may determine that LIDs 32768-33280 of the storage object 308 exist within the forward map 160. As such, the size of the storage object 308 is 512 (the number of LIDs assigned to the storage object 308 that exists in the forward map 160) times the storage location size in use on the storage medium 140 (e.g., the block, sector, and/or data segment 112 size). The storage layer 130 may be further configured to indicate the status of 32768-33280 as being reserved for use by the storage object 308 and assigned to physical storage resources of the non-volatile storage device, and the status of 33281-65536 as being reserved for use by the storage object 308 and un-assigned and/or un-bound to physical storage resources.

In response to loss and/or corruption of the storage metadata 135 at state 415B, the reconstruction module 138 may be configured to reconstruct the forward map 160 by use of the data packets 410A-N and/or reservation metadata 466, as disclosed herein. The reconstruction module 138 may be further configured to provide information pertaining to the storage object 308 to the file system 406 through the interface 131. As disclosed above, the information pertaining to the storage object 308 provided through the interface 131 may include, but is not limited to: the LIDs provisioned for the storage object 308, the status of the LIDs provisioned for the storage object 308, the size of the storage object 308 on the storage device 141 (e.g., 512 block in state 415B), and so on. The file system 406 may use the information to update and/or synchronize internal file system SCM 309 pertaining to the storage object 308. In some embodiments, the storage layer 130 may be configured to push updated information pertaining to the storage object 308 by use of, inter alia, a call-back interface, or the like. The storage layer 130 may push updates to the file system 406 in response to recovering from loss and/or corruption of the storage metadata 135. Alternatively, or in addition, the storage layer 130 may respond to queries pertaining to the storage object 308 received through the interface 131.

In state 415C, the file system 406 may append additional data to the storage object 308. The data may pertain to a different disjoint LID range than the LID range 32768-33280. The storage layer 130 may implement the requested storage operation by appending data packets 420A-N to the storage medium 140, and updating the forward map 160 to bind the LIDs 33792-34816 to the storage addresses of the data packets 420A-N. As disclosed herein, the modifications to the storage object 308 may be implemented in a persistent, crash-safe manner without the need for incrementally allocating logical resources for the storage object 308 and/or persisting updates to the SCM 309 of the file system 406. The reconstruction module 138 may be capable of reconstructing the forward map 160 (and/or another storage metadata 135) of state 415C by use of the contextual, log-based format of the data packets 410A-N and 420A-N and/or the reservation metadata 466, as disclosed herein.

The storage layer 130 may be configured to provide updated information pertaining to the LIDs of the storage object 308 by use of the storage metadata 135 (e.g., the forward map 160). The LID status information pertaining to LIDs 32768-65536 may include, but not limited to: a) whether the LID(s) exist in the forward map 160, b) whether the LID(s) are currently in use to reference data stored on the non-volatile storage device 141, c) the physical storage resources occupied by the LID(s), d) the physical storage size corresponding to the LID(s), and so on. The storage layer 130 may be configured to indicate that LIDs 32768-33280 and 33792-34816 are provisioned to the storage object 308 and exist within the forward map 160 (are bound to data stored on the storage medium 140). The storage layer 130 may be configured to indicate that LIDs 32768-33280 and 33792-34816 are provisioned to the storage object 308 and exist within the forward map 160 (are bound to data stored on the storage medium 140). The storage layer 130 may further indicate the physical storage resources occupied by the LID range 32768-65536 and/or the physical storage size corresponding to the LIDs 32768-65536. The storage layer 130 may be further configured to indicate that LIDs 33281-33791 and 34817-66536 are provisioned for the storage object 308, but do not exist within the forward map 160 and, as such, do not correspond to valid data stored on the storage medium 140.

The storage layer 130 may be further configured to provide status information pertaining to storage objects 308. As disclosed above, the status information pertaining to a storage object 308 may correspond to the status information of the LIDs provisioned to the storage object 308. The status information pertaining to a storage object 308 may include, but is not limited to: a) the number of LIDs designated for the storage object 308 that exists in the forward map 160, b) an identified subset of the designated LIDs that is currently in use to reference data stored on the storage medium 140, c) the physical occupancy corresponding to the designated LIDs, d) the physical storage resource usage represented by the designated LIDs, e) the size of the data of the storage object 308 stored on the storage medium 140 (e.g., the actual physical size of the storage object 308 on the non-volatile storage device 141), and so on.

In the FIG. 4A embodiment, the LID range 32768-65536 is provisioned to the storage object 308. Based on the forward map 160 of state 415C, the storage layer 130 may indicate that 1536 LIDs of the storage object are in the forward map 160 (are in use to reference data stored on the non-volatile storage device 141). The storage layer 130 may further identify the two disjoint LID ranges 33792-34816 and 32768-33280 of the storage object 308 that exist in the forward map 160. The storage layer 130 may determine the physical occupancy and/or physical storage usage of the storage object 308 based on the number of LIDs of the storage object 308 that exists in the forward map 160, as disclosed above.

The storage layer 130 may be further configured to indicate a size of the storage object on the storage medium 140. The storage layer 130 may be configured to determine one of more of an "absolute" size of the storage object 308, and an "extent" size of the storage object 308. As used herein, an "absolute" size refers to a sum of the data corresponding to LIDs that exist within the forward map 160 regardless of whether the LIDs are part of a sparse LID range and/or extent. The absolute size of the storage object 308 may, therefore, be a sum of the LIDs of the storage object 308 that exists within the forward map 160. In state 415C, the absolute size 472A of the storage object 308 is 1536, which is the sum of the size 470A of the LID range 32768-33280 (512) and the size 470B of the LID range 33792-34816 (1024). As used herein, an "extent" size refers to the size corresponding to a range and/or an extent of LIDs defined by upper and lower LID bounds. The upper LID bound refers to the highest-order LID of the storage object 308 that exists in the forward map 160. The lower LID bound refers to the lowest-order LID of the storage object that exists in the forward map 160. The "extent" size corresponds to the LID extent defined by the upper and lower bounds. Accordingly, the extent size of a storage object 308 may include unbound LIDs within a sparsely populated LID range that do not exist within the forward map 160. In state 415C, the extent size 472B of the storage object 308 is 2048 in accordance with the LID range defined by the lower LID bound 32768 and the upper LID bound 34816. The extent size 472B includes LIDs 33281-33791 that do not exist in the forward map 160. The storage layer 130 may be configured to provide one or more of the absolute size 472A and/or the extent size 472B of the storage object 308 through the interface 131.

As disclosed above, the storage layer 130 may be configured to provide status information pertaining to the LIDs within the logical address space 132 through the interface 131. Accordingly, the interface 131 may include API, interfaces, and/or other mechanisms through which the status of LIDs may be queried. The interface 131 may comprise APIs for determining the status of individual LIDs, groups of LIDs, LID ranges, and/or the like. As disclosed above, the storage layer 130 may determine status information of a LID by use of, inter alia, the storage metadata 135. The status information of a LID may indicate whether the LID is currently in use to reference valid data stored on the storage medium 140 (e.g., whether the LID exists in the forward map 160). Alternatively, or in addition, the status information of a LID may indicate whether the LID has been designated for use by a particular storage object 308 and/or storage client 106 (e.g., whether the LID has been reserved in the reservation map 162).

The storage layer 130 may be configured to provide status information pertaining to the storage object 308 by use of, inter alia, a physical occupancy data structure 380, as disclosed herein. In state 415C of the FIG. 4A embodiment, regions 481 and 483 of the physical occupancy data structure 380 may be configured to indicate that the respective LID extents 32768-33280 and 33792-34816 correspond to data stored on the storage medium 140 (e.g., are bound and/or assigned to storage locations on the storage device 141). The regions 484 and 486 may be configured to indicate that the respective LID extents 33281-33791 and 34817-65536 do not correspond to data stored on the storage medium 140 (e.g., are unbound and/or unassigned). Although not depicted in FIG. 4A, the physical occupancy data structure 380 may be further configured to indicate a physical occupancy and/or size of the storage object 308, which may comprise one or more of the range size and/or extent size of the storage object 308, as disclosed herein. The storage layer 130 may be configured to provide access to the physical occupancy data structure 380 to the file system 406 through, inter alia, the interface 131 (e.g., in response to a request).

The file system 406 may be configured to leverage the persistent, crash-safe metadata maintained by the storage layer 130 by, inter alia, deferring (and/or omitting) incremental logical allocation operations and/or deferring (and/or omitting) storage operations to persist updates to the SCM 309 of the file system 406. Following a failure condition resulting in the loss and/or corruption of the file system SCM 309 and/or storage metadata 135, the file system 406 may be configured to access information pertaining to the files managed thereby (e.g., storage objects) through the interface 131. The file system 406 may use the information to rebuild the file system SCM 309 and/or synchronize stored SCM 309 to a current state of the storage objects 308. The file system 406 may be configured to request and/or access: LID allocation information for the storage objects 308, size information pertaining to the storage objects 308 (absolute and/or range size), LID status information, and the like, as disclosed herein. The file system 406 may, therefore, improve the performance of storage operations by delegating the disclosed metadata management functionality to the storage layer 130.

In some embodiments, the interface 131 may be configured to provide APIs and/or API extensions configured to receive information pertaining to the metadata management functionality provided by the storage layer 130. The interface 131 may provide a flag for storage object 308 creation requests configured to indicate whether the storage client 106 is configured to delegate metadata management operations to the storage layer 130, as disclosed herein. In response to the flag, the storage layer 130 may be configured to reserve logical capacity for storage objects 308 of the storage client 106 and/or maintain persistent, crash-safe metadata pertaining to the storage objects 308 of the storage client 106, as disclosed herein.

The interface 131 may be further configured to provide access to other low-level metadata pertaining to the storage metadata 135. The interface 131 may, for example, provide access to the existing API, which, as disclosed herein, may provide status information pertaining to LIDs within the logical address space 132, which may include, but is not limited to: whether the LID is currently in use to reference data stored on the non-volatile storage device 141, whether the LID corresponds to physical storage resources of the non-volatile storage device 141, the physical storage occupancy of the LID, the physical resource usage corresponding to the LID, and so on. In some embodiments, the LID status information further includes an indication of whether the LID is reserved for use by a particular storage object 308 and/or storage client 106, and/or the like.

Figure 5:
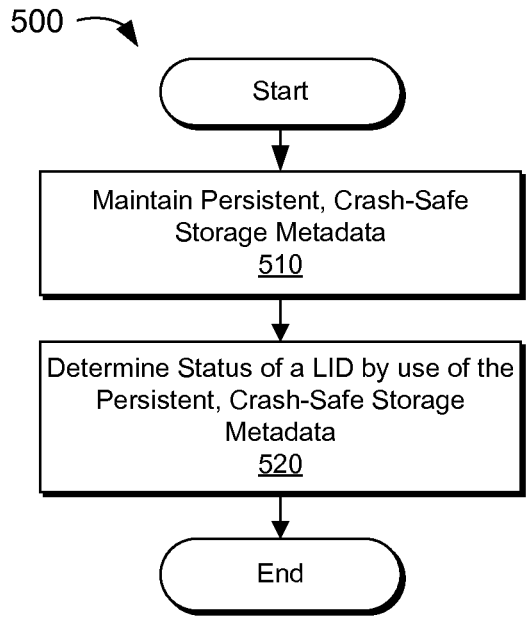
FIG. 5 is a flow diagram of one embodiment of a method for managing storage metadata.

FIG. 5 is a flow diagram of one embodiment of a method 500 for managing storage metadata. Step 510 may comprise maintaining persistent, crash-safe storage metadata 135 pertaining to a logical address space 132 of a non-volatile storage device 141. The storage metadata 135 may include a forward map 160 configured to bind LIDs of the logical address space 132 to data stored on the non-volatile storage device 141. Step 510 may further comprise storing data on the non-volatile storage device 141 in a contextual, log-based format by use of, inter alia, the log storage module 136, such that the forward map 160 (and/or other storage metadata 135) can be reconstructed from the data stored on the non-volatile storage device 141. The contextual data format may comprise a packet format 110 configured to associate data segments 112 with respective persistent metadata 114. The persistent metadata 114 may comprise the LIDs bound to the data segments 112. The data segment 112 and corresponding persistent metadata 114 may be stored together on the storage medium 140 in a single write operation. The log order of the data stored on the storage medium 140 may be determined by use of, inter alia, sequence identifiers 113 on storage divisions of the storage medium 140, and the sequential order of data within the storage address space 144.

The persistent, crash-safe storage metadata of step 510 may comprise a forward map 160 that identifies LIDs of the logical address space 132 that are currently in use to reference data stored on the non-volatile storage device 141. The forward map 160 may comprise bindings between LIDs of the logical address space 132 and data stored on the non-volatile storage device 141 (e.g., storage addresses of data packets 110). Accordingly, LIDs that exist in the forward map 160 may be identified as LIDs that correspond to valid data of a storage object 308 and/or storage client 106. Conversely, LIDs that do not exist in the forward map may be identified as LIDs that are not currently in use to reference data on the non-volatile storage device 141. The forward map 160 (and/or other storage metadata 135) may be capable of being reconstructed from the contents of the storage medium 140 (e.g., by the reconstruction module 138, as disclosed herein).

Step 520 may comprise determining the status of a LID by use of the persistent, crash-safe metadata of step 510. Determining the status of the LID at step 520 may comprise determining whether the LID exists within the forward map 160, as disclosed herein. Step 520 may comprise determining that a LID is currently in use to reference data stored on the storage medium 140 in response to determining that the LID exists in the forward map 160. Alternatively, step 520 may comprise determining that a LID is not currently in use to reference data stored on the storage medium 140 in response to determining that the LID does not exist in the forward map 160.

Step 520 may further comprise providing an interface 131 configured to provide LID status information to storage clients 106. As disclosed above, the interface 131 may be configured to provide for determining the status of particular LIDs, collections of LIDs, LID ranges, LID extents, and/or the like. The interface 131 may comprise a storage interface, extensions to an existing standardized storage interface, an API, and/or the like.

In some embodiments, the persistent, crash-safe metadata of step 510 may further comprise a reservation map 162 configured to identify LIDs that have been designated for use by a particular storage object 308 and/or storage client 106. The reservation map 162 may be made persistent and/or crash safe by use of reservation metadata 366 stored on the storage medium 140, as disclosed herein. In such embodiments, step 520 may further comprise determining the reservation status of a LID. The reservation status of a LID may indicate whether the LID is reserved for a particular storage object 308 and/or storage client 106 by use of the reservation map 164. As disclosed herein, the reservation status of a LID may be determined independently of whether the LID exists within the forward map 160. A LID may be reserved but may not exist within the forward map 160, and vice versa. Step 520 may further comprise configuring the interface 131 to provide LID reservation status information to storage clients 106, as disclosed herein.

Figure 6:
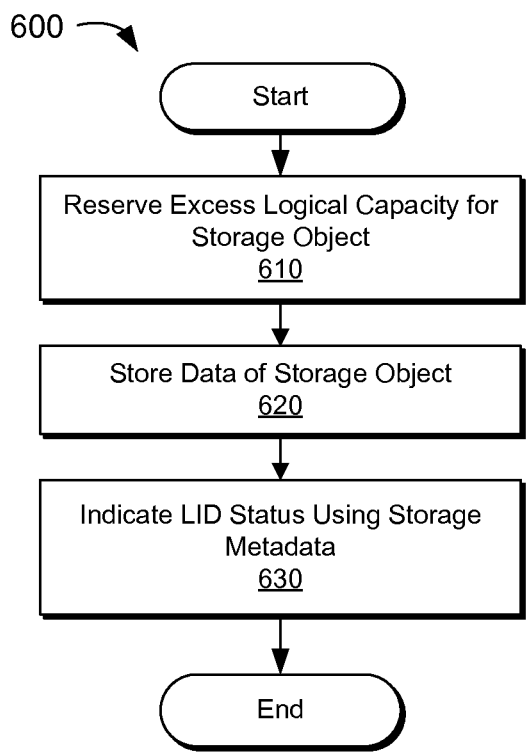
FIG. 6 is a flow diagram of one embodiment of a method for managing storage metadata.

FIG. 6 is a flow diagram of another embodiment of a method 600 for managing storage metadata. Step 610 may comprise reserving excess logical capacity for a storage object 308 within a logical address space 132 of a non-volatile storage device 141. The logical address space 132 may be thinly provisioned and, as such, may be larger than the storage address space 144 of the non-volatile storage device 141. Reserving excess logical capacity may comprise designating a collection of LIDs for use by the storage object 308 (and/or a particular storage client 106). The LID reservations of step 610 may be maintained within a reservation map 162 and may be made persistent and crash-safe by storing reservation metadata 366 on the storage medium 140, as disclosed herein.

The excess logical capacity may be reserved for the storage object 308 in response to a request to open and/or create the storage object 308. The request may comprise a request to open and/or create one or more of an empty file, a zero-length file, a zero-size file, a fixed-length file, an empty data structure (e.g., an empty object, table, etc.), and/or the like. Reserving the excess logical capacity at step 610 may comprise designating more LIDs for use by the storage object 308 than requested and/or currently needed by the storage object 308. Step 610 may comprise reserving excess logical capacity in response to a request for excess logical capacity from a storage client 106 (e.g., an explicit reservation request). In some embodiments, step 610 comprises reserving a contiguous range of LIDs for the storage object 308 within a selected reservation region 450A-D. The reservation region 450A-D may be selected according to a reservation policy, which may include, but is not limited to: availability of contiguous LID ranges within the reservation regions 450A-D, whether the LID range is expected to grow, information pertaining to the storage client 106 associated with the storage object 308, information pertaining to an application associated with the storage object 308, information pertaining to a user of the storage object 308, request parameters (e.g., ioctrl, fadvise, etc.), and/or the like.

Step 620 may comprise storing data of the storage object 308 on the storage medium 140. Step 620 may comprise storing the data in a contextual, log-based format configured to bind the data to respective LIDs by use of the log storage module 136, as disclosed herein. Step 620 may further comprise maintaining persistent, crash-safe storage metadata 135, by the storage layer 130, pertaining to the data storage operations. The persistent, crash-safe persistent metadata may include a forward map 160 that is configured to tie LIDs reserved for use by the storage object 308 to storage addresses of data stored on the storage medium 140. In some embodiments, the data may be stored in a data packet format 110. Step 620 may further comprise appending the data to a storage log on the storage medium 140 from which the log order of storage operations performed on the storage medium 140 may be determined. Step 620 may, therefore, comprise storing data such that the storage metadata 135 pertaining to the storage operations of step 620 may be reconstructed based on the contents of the storage medium 140 (e.g., by use of the reconstruction module 138, as disclosed herein).

Step 630 may comprise indicating the status of a LID of the logical address space 132 by use of persistent, crash-safe storage metadata 135 maintained by the storage layer 130. The status of a LID may indicate one or more of: a) whether the LID exists in the forward map 160, b) whether the LID is currently in use to reference data stored on the non-volatile storage device 141, c) the physical storage resources occupied by the LID, d) the physical storage size corresponding to the LID, and so on. The status of the LID may be identified by use of the forward map 160. As disclosed above, LIDs that exist in the forward map 160 are tied to data stored on the non-volatile storage device 141 and LIDs that do not exist in the forward index are not currently in use to reference data on the non-volatile storage device 141. The status of the LID may further include whether the LID has been designated for use by a particular storage object 308 and/or storage client 106, which may be determined by use of, inter alia, the reservation map 162, as disclosed herein.

Step 630 may comprise indicating the status of a particular LID, a collection of LIDs, a LID range, a LID extent, and/or the like. In some embodiments step 630 comprises indicating the status of a collection of LIDs designated for use by a storage object 308. The LID status information pertaining to the storage object 308 may include, but is not limited to: a) the number of designated LIDs that exist in the forward map 160, b) an identified subset of the designated LIDs that is currently in use to reference data stored on the storage medium 140, c) the physical occupancy corresponding to the designated LIDs, d) the physical storage usage represented by the designated LIDs, e) the size of the data of the storage object 308 stored on the storage medium 140, and so on.

Step 630 may be performed in response to reconstructing the persistent, crash-safe storage metadata 135 after a failure condition (e.g., by the reconstruction module 138, as disclosed herein). Step 630 may be configured to provide LID status information to storage clients 106, which may enable storage clients 106 to reconstruct and/or synchronize SCM 309, such as storage object 308 LID status information, storage object 308 size information, and the like.

Step 630 may comprise providing the LID status indication in response to a request from a storage client 106. The request may be received through the interface 131. Alternatively, or in addition, step 630 may comprise pushing LID status information to a storage client 106 (e.g., by use of a call-back interface, publication interface, and/or the like).

Figure 7:
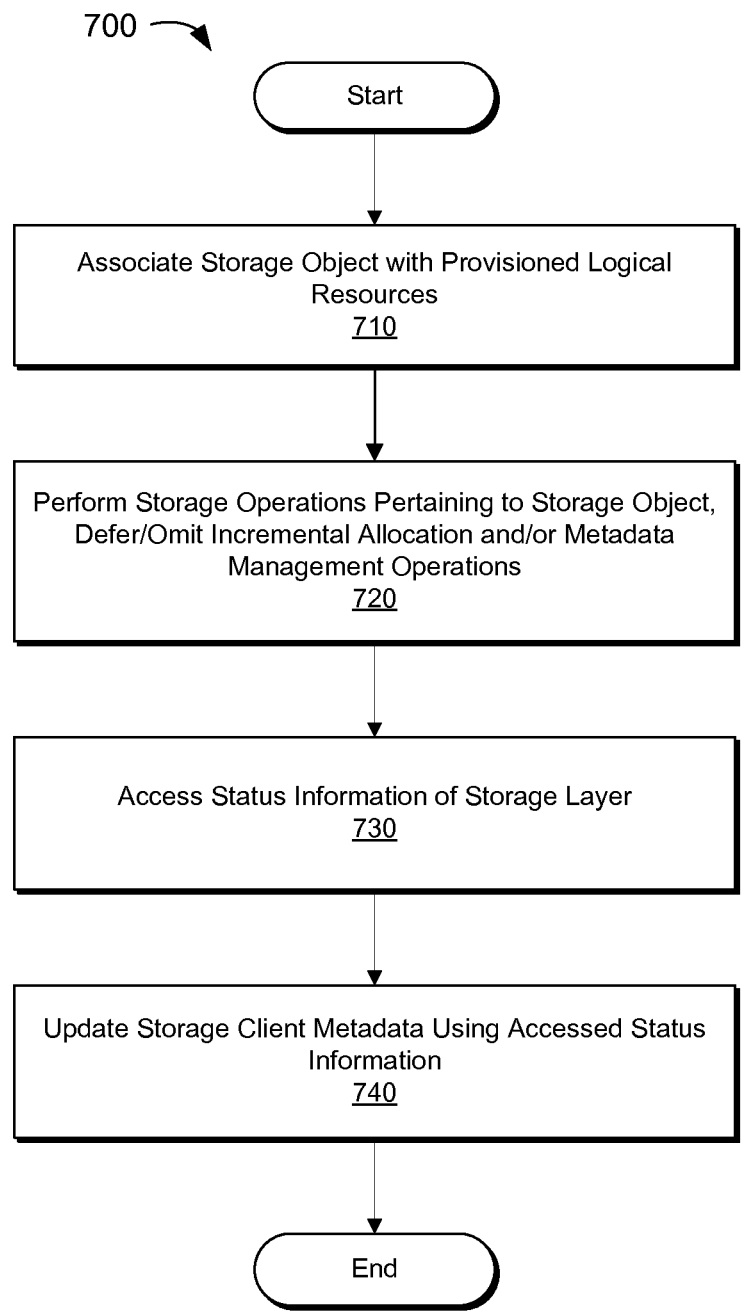
FIG. 7 is a flow diagram of one embodiment of a method for leveraging storage metadata of a storage layer.

FIG. 7 is a flow diagram of one embodiment of a method for leveraging storage metadata maintained by the storage layer 130. Step 710 may comprise associating a storage object 308 with logical resources provisioned for the storage object by the storage layer 130. Step 710 may comprise associating the storage object 308 with a collection of LIDs provisioned to the storage object 308 by the allocation module 133, as disclosed herein. The collection of LIDs may be reserved for the storage object 308 in response to a request to create and/or open the storage object 308. The collection of LIDs may comprise a larger logical capacity than requested and/or needed by the storage object 308.

Step 720 may comprise performing storage operations pertaining to the storage object 308 by use of the storage layer 130. In some embodiments, step 720 includes omitting, from the storage operations, requests to incrementally allocate logical capacity for storage object 308. Accordingly, step 720 may comprise performing the storage operations using the over-provisioned collection of LIDs of step 710.

Step 720 may further comprise deferring (and/or omitting) updates to persistent metadata of the storage client 106 corresponding to the storage object 308. Step 720 may, therefore, comprise delegating, to the storage layer 130, management of persistent, crash-safe metadata pertaining to the collection of LIDs provisioned to the storage object 308.

Step 730 may comprise accessing information pertaining to the storage object 308 and/or the LIDs provisioned to the storage object 308 by use of the storage layer 130. Step 730 may be performed in response to a failure condition, resulting in the loss of the SCM 309. Alternatively, step 730 may be performed to update the SCM 309 to reflect changes made to the object in a plurality of storage operations (e.g., synchronize the SCM 309 to the storage metadata 135). Step 730 may comprise accessing information pertaining to a LID of the storage object 308, which information may include, but is not limited to: a) whether the LID exists in the forward map 160, b) whether the LID is currently in use to reference data stored on the non-volatile storage device 141, c) the physical storage resources occupied by the LID (if any), d) the physical storage size corresponding to the LID, and so on. Alternatively, or in addition, the information may correspond to the storage object 308 and/or the collection of LIDs provisioned to the storage object 308, which information may include, but is not limited to: a) the number of LIDs of the storage object 308 that exists in the forward map 160 of the storage layer 130, b) an identified subset of the provisioned LIDs that is currently in use to reference data stored on the storage medium 140, c) the physical occupancy corresponding to the provisioned LIDs, d) the physical storage resource usage represented by the provisioned LIDs, e) the size of the data of the storage object 308 stored on the storage medium 140 (e.g., the size of the storage object 308 on the non-volatile storage device 141), and so on.

Step 740 may comprise updating SCM 309 pertaining to the storage object 308 by use of the status information accessed at step 730. Step 740 may comprise updating and/or synchronizing the SCM 309 to indicate, inter alia, a current size of the storage object 308, the LIDs provisioned to the storage object 308, the LIDs that are currently in use to reference data of the storage object 308 on the non-volatile storage device 141, and so on.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternative ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-ray discs, and the like), flash memory, and/or the like. These computer program instructions may be loaded onto a general purpose computer, a special purpose computer, or another programmable data processing apparatus to produce a machine, such that the instructions that execute on the computer or another programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or another programmable data processing apparatus to cause a series of operational steps to be performed on the computer or another programmable apparatus to produce a computer-implemented process, such that the instructions that execute on the computer or another programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the present disclosure.

We claim:

1. A method, comprising:
   receiving a storage request comprising a storage capacity request for an object;
   reserving logical identifiers of a logical address space corresponding to a non-volatile storage device for the object in response to receiving the storage request, wherein a storage capacity of the reserved logical identifiers exceeds a capacity requirement of the object identified by the storage capacity request;
   storing data of the object on the non-volatile storage device in a format configured to bind the stored data to respective logical identifiers reserved for the object;
   storing metadata with the data of the object, wherein the metadata comprises logical identifiers of the logical identifiers reserved for the object that are bound to the stored data;
   determining logical identifier status information by use of the metadata stored with the stored data, wherein the logical identifier status information comprises information determined using the metadata and the information indicates:
     whether the logical identifiers that are bound to the stored data exist in a forward map, and
     a physical storage size corresponding to the logical identifiers that are bound to the stored data; and
   determining a physical occupancy of the object on the non-volatile storage device by use of the logical identifier status information, wherein the physical occupancy of the object is different than the storage capacity of the reserved logical identifiers.

2. The method of claim 1, wherein:
   the object is a file system object; and
   the storage request further comprises one of: a request to open a file, a request to open a zero-size file, a request to open a zero-length file, and a request to open an empty file.

3. The method of claim 1, wherein the data and the metadata are stored in a single write operation.

4. The method of claim 1, wherein the information indicates:
   whether the logical identifiers that are bound to the stored data are used to reference stored data on the non-volatile storage device, and
   physical storage resources occupied by the logical identifiers that are bound to the stored data.

5. The method of claim 1, wherein the metadata comprises a persistent trim note configured to invalidate at least a portion of the stored data.

6. The method of claim 1, wherein the metadata comprises a number of the identified logical identifiers reserved for the object that are bound to the stored data.

7. The method of claim 1, wherein the metadata comprises a physical occupancy of the logical identifiers reserved for the object on the non-volatile storage device.

8. The method of claim 1, wherein:
   the metadata comprises an identified range of logical identifiers reserved for the object;
   the identified range comprises logical identifiers that are assigned to storage addresses of the non-volatile storage device comprising data of the object; and
   the identified range of logical identifiers comprises one or more logical identifiers that are not assigned to storage addresses of the non-volatile storage device.

9. The method of claim 1, further comprising identifying the logical identifiers reserved for the object that are bound to the stored data to a file system for use in reconstructing a file system data structure.

10. The method of claim 1, further comprising deferring an update to a persistent file system data structure pertaining to the object in response to storing the data of the object on the non-volatile storage device.

11. The method of claim 1, further comprising appending one or more packets comprising data of the object to a storage log on the non-volatile storage device, the packets comprising persistent metadata configured to associate data of the packets with respective logical identifiers.

12. The method of claim 1, wherein storing the data of the object comprises storing a data segment of the object with the metadata, the metadata configured to bind the data segment to one of the reserved logical identifiers in one of an atomic write operation on the non-volatile storage device, and a single write operation on the non-volatile storage device.

13. An apparatus, comprising:
a storage request receiver module configured to receive a storage request comprising a storage capacity request for an entity;
an allocation module configured to designate logical block addresses of a logical address space of a non-volatile storage device for use by the entity in response to receiving the storage request, wherein a storage capacity represented by the designated logical block addresses exceeds a size of the entity identified by the storage capacity request; and
a storage layer configured to:
store data of the entity on respective storage locations of the non-volatile storage device with metadata comprising logical block addresses of the logical block addresses designated for use by the entity that are bound to the stored data;
determine logical identifier status information by use of the metadata stored with the stored data, wherein the logical identifier status information comprises information determined using the metadata and the information indicates:
whether the logical block addresses that are bound to the stored data exist in a forward map,
whether the logical block addresses that are bound to the stored data are used to reference stored data on the non-volatile storage device,
physical storage resources occupied by the logical block addresses that are bound to the stored data, and
a physical storage size corresponding to the logical block addresses that are bound to the stored data;
determine a physical occupancy of the entity by use of the logical identifier status information, wherein the physical occupancy of the entity is different than the storage capacity represented by the designated logical block addresses; and
indicate physical storage resources in use by a subset of the designated logical block addresses to reference data of the entity;
wherein the storage request receiver module, the allocation module, and the storage layer comprise one or more of logic hardware and a non-transitory computer readable storage medium storing computer executable code.

14. The apparatus of claim 13, further comprising a reconstruction module configured to determine the physical storage resources in use by the entity based on a number of storage locations of the non-volatile storage device comprising data of the entity.

15. The apparatus of claim 13, further comprising a reconstruction module configured to identify the subset of the designated logical block addresses by accessing data packets comprising data of the entity stored on the non-volatile storage device.

16. The apparatus of claim 13, further comprising a reconstruction module configured to reconstruct a forward map comprising entries configured to bind logical identifiers designated for use by the entity to storage addresses of the non-volatile storage device by use of the metadata stored with the data of the entity on the non-volatile storage device.

17. The apparatus of claim 13, wherein a file system is configured to update persistent file system metadata pertaining to the entity based on the physical storage resources in use by the subset of the designated logical block addresses to reference data of the entity indicated by the storage layer.

18. The apparatus of claim 13, wherein:
the storage layer is configured to store the data of the entity in response to one or more storage requests of a storage client; and
the storage client is configured to defer an update to persistent metadata pertaining to the entity in response to completion of the one or more storage requests.

19. The apparatus of claim 18, wherein the storage client comprises one of: a file system, an operating system, and a database.

20. The apparatus of claim 13, wherein:
the allocation module is further configured to maintain a sparse logical address space for the non-volatile storage device; and
a logical capacity of the logical address space exceeds a physical storage capacity of the non-volatile storage device.

21. The apparatus of claim 13, wherein:
the entity is a file; and
the storage request comprises a request pertaining to a zero-length file.

22. The apparatus of claim 13, wherein:
the allocation module is configured to select the designated logical block addresses from one of a plurality of allocation regions of a logical address space of the non-volatile storage device; and
the allocation regions have different respective allocation granularities.

23. An apparatus comprising:
means for receiving a storage request comprising a storage capacity request for a file;
means for reserving identifiers of a logical address space of a non-volatile storage medium for the file in response to receiving the storage request, wherein a storage capacity corresponding to the reserved identifiers exceeds a storage requirement of the file identified by the storage capacity request;
means for storing metadata on the non-volatile storage medium with data of the file, the metadata configured to tie the data of the file stored on the non-volatile storage medium with respective identifiers reserved to the file, to determine logical identifier status information by use of the metadata stored with the data, and to determine a physical occupancy of the file by use of the logical identifier status information, wherein the physical occupancy of the file is different than the storage capacity corresponding to the reserved identifiers, and the storage capacity of the reserved identifiers is determined by use of the metadata, wherein the logical identifier status information comprises information determined using the metadata and the information indicates:
whether the identifiers that are tied to the data exist in a forward map,
whether the identifiers that are tied to the data are used to reference stored data on the non-volatile storage medium,
physical storage resources occupied by the identifiers that are tied to the data, and
a physical storage size corresponding to the identifiers that are tied to the data; and means for restoring file system metadata pertaining to the file based on a physical storage occupancy of the reserved identifiers determined by the storage layer;

wherein the means for receiving a storage request, the means for receiving identifiers, the means for storing metadata, and the means for restoring comprise one or more of logic hardware and a non-transitory computer readable storage medium storing computer executable code.

24. The apparatus of claim 23, further comprising means for generating a forward map comprising ties between one or more of the reserved identifiers and data of the file stored on the non-volatile storage medium by way of the metadata stored on the non-volatile storage medium.

* * * * *